(12) United States Patent
Li et al.

(10) Patent No.: US 11,792,438 B2
(45) Date of Patent: Oct. 17, 2023

(54) USING NEURAL NETWORK FILTERING IN VIDEO CODING

(71) Applicant: Lemon Inc., Grand Cayman (KY)

(72) Inventors: Yue Li, San Diego, CA (US); Li Zhang, San Diego, CA (US); Kai Zhang, San Diego, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/488,179

(22) Filed: Sep. 28, 2021

(65) Prior Publication Data

US 2022/0109890 A1 Apr. 7, 2022

Related U.S. Application Data

(60) Provisional application No. 63/087,113, filed on Oct. 2, 2020.

(51) Int. Cl.

| | | |
|---|---|---|
| *H04N 19/85* | (2014.01) | |
| *H04N 19/96* | (2014.01) | |
| *H04N 19/174* | (2014.01) | |
| *H04N 19/176* | (2014.01) | |
| *H04N 19/184* | (2014.01) | |
| *H04N 19/124* | (2014.01) | |
| *H04N 19/107* | (2014.01) | |

(Continued)

(52) U.S. Cl.
CPC ............. *H04N 19/85* (2014.11); *G06N 3/04* (2013.01); *H04N 19/107* (2014.11); *H04N 19/124* (2014.11); *H04N 19/174* (2014.11); *H04N 19/176* (2014.11); *H04N 19/184* (2014.11); *H04N 19/573* (2014.11); *H04N 19/96* (2014.11)

(58) Field of Classification Search
None
See application file for complete search history.

(56) References Cited

U.S. PATENT DOCUMENTS

| | | | |
|---|---|---|---|
| 6,674,911 B1 * | 1/2004 | Pearlman | G06T 9/40 375/240.19 |
| 10,341,670 B1 * | 7/2019 | Brailovskiy | H04N 19/146 |
| 10,701,394 B1 * | 6/2020 | Caballero | G06N 3/08 |

(Continued)

FOREIGN PATENT DOCUMENTS

| | | |
|---|---|---|
| CN | 107925762 A | 4/2018 |
| CN | 108184129 A | 6/2018 |

(Continued)

OTHER PUBLICATIONS

Bross et al. "Versatile Video Coding (Draft 5)," Joint Video Experts Team (JVET) of ITU-t SG 16 WP 3 and ISO/IEC JTC 1/SC 29/WG 11, 14th Meeting, Geneva, CH, Mar. 19-27, 2019, document JVET-N1001, 2019.

(Continued)

*Primary Examiner* — Mohammad J Rahman
(74) *Attorney, Agent, or Firm* — Perkins Coie LLP

(57) ABSTRACT

Methods, systems, apparatus for media processing are described. One example method of digital media processing includes determining, for a conversion between visual media data and a bitstream of the visual media data, how to apply one or more convolutional neural network filters to at least some samples of a video unit of the visual media data according to a rule; and performing the conversion based on the determining.

17 Claims, 20 Drawing Sheets

(51) Int. Cl.
*H04N 19/573* (2014.01)
*G06N 3/04* (2023.01)

(56) References Cited

U.S. PATENT DOCUMENTS

| | | | |
|---|---|---|---|
| 10,706,350 B1* | 7/2020 | Tran | G06N 3/04 |
| 11,023,730 B1* | 6/2021 | Zhou | G06K 9/6256 |
| 2015/0317557 A1* | 11/2015 | Julian | G06N 3/049 |
| | | | 706/25 |
| 2017/0330363 A1* | 11/2017 | Song | G06N 3/045 |
| 2017/0347060 A1* | 11/2017 | Wang | G06N 3/0445 |
| 2018/0204051 A1* | 7/2018 | Li | G06T 7/11 |
| 2019/0035116 A1* | 1/2019 | Xing | G06N 5/046 |
| 2019/0108432 A1* | 4/2019 | Lu | G06N 3/08 |
| 2019/0147372 A1* | 5/2019 | Luo | G06V 10/82 |
| | | | 706/20 |
| 2019/0246102 A1 | 8/2019 | Cho et al. | |
| 2019/0273948 A1* | 9/2019 | Yin | H04N 19/172 |
| 2020/0057935 A1* | 2/2020 | Wang | G06F 17/15 |
| 2021/0158072 A1* | 5/2021 | Zhang | G06V 10/764 |
| 2021/0375260 A1* | 12/2021 | Yu | G10L 15/142 |
| 2022/0101095 A1 | 3/2022 | Li et al. | |
| 2022/0116600 A1* | 4/2022 | Rosewarne | H04N 19/119 |

FOREIGN PATENT DOCUMENTS

| | | |
|---|---|---|
| EP | 3451293 A1 | 3/2019 |
| EP | 3342164 A4 | 4/2020 |
| WO | 2017036370 A1 | 3/2017 |
| WO | 2019182159 A1 | 9/2019 |
| WO | 2020062074 A1 | 4/2020 |

OTHER PUBLICATIONS

Hsiao et al. "CE13-.1: Convolutional Neural Network Loop Filter," Joint Video Experts Team (JVET) of ITU-T SG 16 WP 3 and ISO/IEC JTC 1/SC 29/WG 11 14th Meeting, Geneva, CH, Mar. 19-27, 2019, document JVET-N0110, 2019.

Li et al. "AHG11: Convolutional Neural Networks-Based In-Loop Filter," Joint Video Experts Team (JVET) of ITU-T SG 16 WP 3 and ISO/IEC JTC 1/SC 29, 20th Meeting, by Teleconference, Oct. 7-16, 2020, document JVET-T0088, 2020.

Park et al. "CNN-Based In-Loop Filtering for Coding Efficiency Improvement," 2016 IEEE 12th Image, Video and Multidimensional Signal Processing Workshop (IVMSP), IEEE, Jul. 11, 2016, pp. 1-5, XP032934608.

Xu et al. "Non-CE10: A CNN Based In-Loop Filter for Intra Frame," Joint Video Experts Team (JVET) of ITU-T SG 16 WP 3 and ISO/IEC JTC 1/SC 29/WG 11 15th Meeting, Gothenburg, SE Jul. 3-12, 2019, document JVET-O0157, 2019.

Extended European Search Report from European Patent Application 21199996.6 dated Mar. 3, 2022.

Extended European Search Report from European Patent Application 21199983.4 dated Mar. 4, 2022.

Balle et al. "End-to-end Optimization of Nonlinear Transform Codes for Perceptual Quality," Picture Coding Symposium, IEEE, Oct. 2016, Center of Neural Science and Courant Institute of Mathematical Sciences, New York University, New York, 1-5.

Dai et al. "A Convolutional Neural Network Approach for Post-Processing in HEVC Intra Coding," Oct. 2016, CAS Key Laboratory of Technology in Geo-Spatial Information Processing and Application System, University of Science and Technology of China, Hefei China, In MMM. Springer, 28-39.

Li et al. Fully Connected Network-Based Intra Prediction for Image Coding, 2018 IEEE, Transactions on Image Processing, 2018, 27(7):3236-3247.

Lim et al. "CE2: Subsampled Laplacian Calculation (Test 6.1, 6.2, 6.3, and 6.4)." Joint Video Experts Team (JVET) of ITU-T SG 16 WP 3 and ISO/IEC JTC 1/SC 29/WG 1112th Meeting: Macao, CN, Oct. 3-12, 2018, document JVET-L0147, 2018.

Pfaff et al. "Neural Network Based Intra Prediction for Video Coding," 2018, In Applications of Digital Image Processing XLI, vol. 10752. International Society for Optics and Photonics, 1075213.

Song et al. "Neural Network-Based Arithmetic Coding of Intra Prediction Modes in HEVC," Sep. 2017, CAS Key Laboratory of Technology in Geo-Spatial Information Processing and Application System, University of Science and Technology of China, Hefei China, in VCIP, IEEE, 1-4.

Taquei et al. "CE5: Results of Tests CE5-3.1 to CE5-3.4 on Non-Linear Adaptive Loop Filter," Joint Video Experts Team (JVET) of ITU-T SG 16 WP 3 and ISO/IEC JTC 1/SC 29/WG 1114th Meeting: Geneva, CH, Mar. 19-27, 2019, document JVET-N0242, 2019.

Theis et al. "Lossy Image Compression with Compressive Autoencoders," ICLR, Mar. 2017, London UK.

http://phenix.it-sudparis.eu/jvet/doc_end_user/current_document.php?id=10399.

https://vcgit.hhi.fraunhofer.de/jvet/VVCSoftware_VTM/-/tags/VTM-10.0.

Wu et al. Research on Video Coding Loop Filtering Technology based on Progressive Network, Jun. 18, 2020 (cited in CN202111163049.5 OA1 dated Apr. 22, 2023).

* cited by examiner

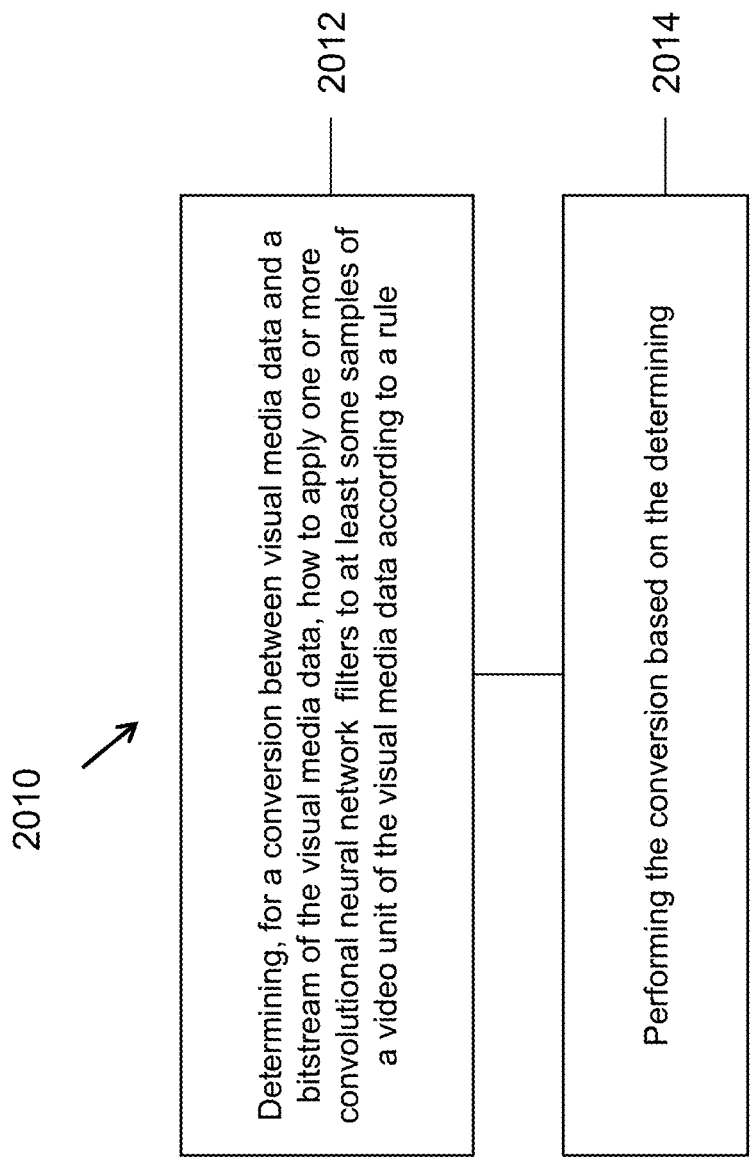

USING NEURAL NETWORK FILTERING IN VIDEO CODING

CROSS REFERENCE TO RELATED APPLICATIONS

Under the applicable patent law and/or rules pursuant to the Paris Convention, this application is made to timely claims the priority to and benefits of U.S. Provisional Patent Application No. 63/087,113, filed on Oct. 2, 2020. For all purposes under the law, the entire disclosure of the aforementioned application is incorporated by reference as part of the disclosure of this application.

TECHNICAL FIELD

This patent document relates to digital media coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by image, audio or video encoders and decoders for ensuring integrity of encoding operations, decoding operations, and encoded digital media segments.

In one example aspect, a method of processing visual media data is disclosed. The method includes determining, for a conversion between visual media data and a bitstream of the visual media data, how to apply one or more convolutional neural network filters to at least some samples of a video unit of the visual media data according to a rule; and performing the conversion based on the determining In another example aspect, a video processing apparatus is disclosed. The video processing apparatus comprises a processor configured to implement above-described methods.

In yet another example aspect, a method of storing visual media data to a file including one or more bitstreams is disclosed. The method corresponds to above-described methods and further includes storing the one or more bitstream to a non-transitory computer-readable recording medium.

In yet another example aspect, a computer readable medium that stores a bitstream is disclosed. The bitstream is generated according to above-described methods.

In yet another example aspect, a video processing apparatus for storing a bitstream is disclosed, wherein the video processing apparatus is configured to implement above-described methods.

In yet another example aspect, a computer readable medium on which a bitstream complies to a file format that is generated according to above-described methods is disclosed.

These, and other, features are described throughout the present document.

BRIEF DESCRIPTION OF DRAWINGS

FIG. 7 shows pixels involved in filter on/off decision and strong/weak filter selection

FIGS. 10A to 10C show relative coordinator for the 5×5 diamond filter support. FIG. 10A shows diagonal, FIG. 10B shows vertical flip and FIG. 10C shows rotation support.

FIG. 12A shows M denotes the number of feature maps. N stands for the number of samples in one dimension. FIG. 12B shows construction of ResBlock (residual block) in FIG. 12A.

FIG. 20 shows a flowchart for an example method for processing visual media data based on some implementations of the disclosed technology.

DETAILED DESCRIPTION

Figure 1:
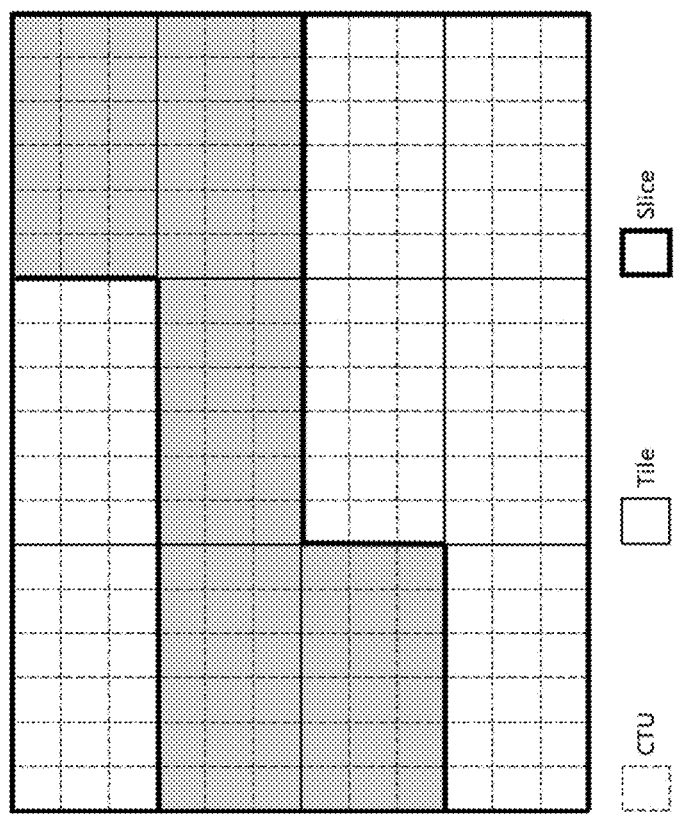
FIG. 1 shows a picture with 18 by 12 luma CTUs that is partitioned into 12 tiles and 3 raster-scan slices.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Initial Discussion

This document is related to video coding technologies. Specifically, it is related to the loop filter in image/video coding. It may be applied to the existing video coding standard like High-Efficiency Video Coding (HEVC), Versatile Video Coding (VVC), or the standard (e.g., AVS3) to be finalized. It may be also applicable to future video coding standards or video codec or being used as post-processing method which is out of encoding/decoding process.

2. Video Coding Introduction

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC. VVC version 1 was finalized in July 2020.

The latest version of VVC draft, i.e., Versatile Video Coding (Draft 10) could be found at:

phenix.it-sudparis.eu/jvet/doc_end_user/current_document.php?id=10399

The latest reference software of VVC, named VTM, could be found at:

vcgit.hhi.fraunhofer.de/jvet/VVCSoftware_VTM/-/tags/VTM-10.0

2.1. Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

2.1.1. 4:4:4

Each of the three Y'CbCr components have the same sample rate, thus there is no chroma subsampling. This scheme is sometimes used in high-end film scanners and cinematic post production.

2.1.2. 4:2:2

The two chroma components are sampled at half the sample rate of luma: the horizontal chroma resolution is halved. This reduces the bandwidth of an uncompressed video signal by one-third with little to no visual difference.

2.1.3. 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

In MPEG-2, Cb and Cr are cosited horizontally. Cb and Cr are sited between pixels in the vertical direction (sited interstitially).

In JPEG/JFIF, H.261, and MPEG-1, Cb and Cr are sited interstitially, halfway between alternate luma samples.

In 4:2:0 DV, Cb and Cr are co-sited in the horizontal direction. In the vertical direction they are co-sited on alternating lines.

2.2. Definitions of Video Units

A picture is divided into one or more tile rows and one or more tile columns. A tile is a sequence of CTUs that covers a rectangular region of a picture.

A tile is divided into one or more bricks, each of which consisting of a number of CTU rows within the tile.

A tile that is not partitioned into multiple bricks is also referred to as a brick. However, a brick that is a true subset of a tile is not referred to as a tile.

A slice either contains a number of tiles of a picture or a number of bricks of a tile.

Two modes of slices are supported, namely the raster-scan slice mode and the rectangular slice mode. In the raster-scan slice mode, a slice contains a sequence of tiles in a tile raster scan of a picture. In the rectangular slice mode, a slice contains a number of bricks of a picture that collectively form a rectangular region of the picture. The bricks within a rectangular slice are in the order of brick raster scan of the slice.

FIG. 1 shows an example of raster-scan slice partitioning of a picture, where the picture is divided into 12 tiles and 3 raster-scan slices.

Figure 2:
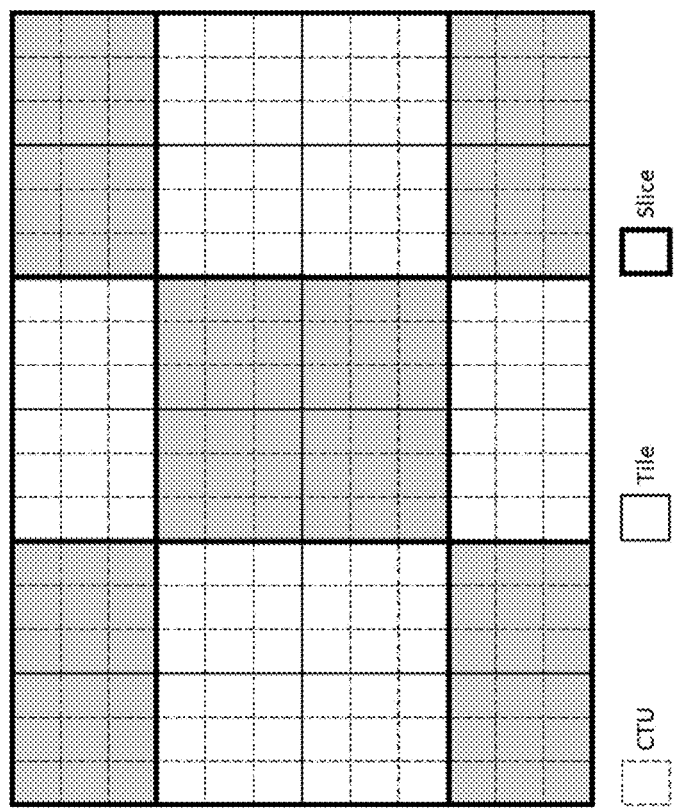
FIG. 2 shows a picture with 18 by 12 luma CTUs that is partitioned into 24 tiles and 9 rectangular slices.

FIG. 2 in the VVC specification shows an example of rectangular slice partitioning of a picture, where the picture is divided into 24 tiles (6 tile columns and 4 tile rows) and 9 rectangular slices.

Figure 3:
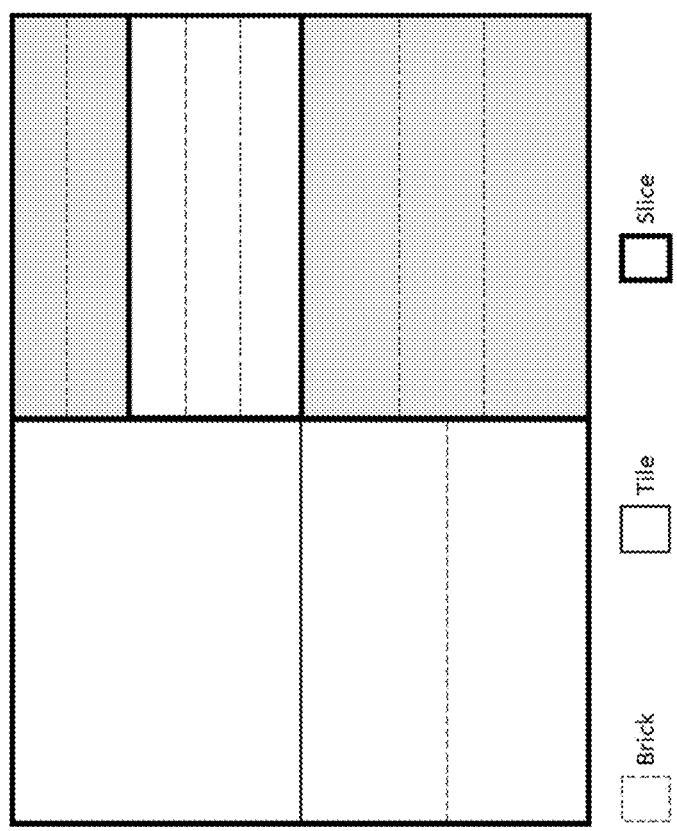
FIG. 3 shows a picture that is partitioned into 4 tiles, 11 bricks, and 4 rectangular slices.

FIG. 3 the VVC specification shows an example of a picture partitioned into tiles, bricks, and rectangular slices, where the picture is divided into 4 tiles (2 tile columns and 2 tile rows), 11 bricks (the top-left tile contains 1 brick, the top-right tile contains 5 bricks, the bottom-left tile contains 2 bricks, and the bottom-right tile contain 3 bricks), and 4 rectangular slices.

2.2.1. CTU/CTB Sizes

In VVC, the CTU size, signaled in SPS by the syntax element log 2_ctu_size_minus2, could be as small as 4×4.

7.3.2.3 Sequence Parameter Set RBSP Syntax

| seq_parameter_set_rbsp( ) { | Descriptor |
|---|---|
| sps_decoding_parameter_set_id | u(4) |
| sps_video_parameter_set_id | u(4) |
| sps_max_sub_layers_minus1 | u(3) |
| sps_reserved_zero_5bits | u(5) |
| profile_tier_level( sps_max_sub_layers_minus1 ) | |
| gra_enabled_flag | u(1) |

| seq_parameter_set_rbsp( ) { | Descriptor |
|---|---|
|   sps_seq_parameter_set_id | ue(v) |
|   chroma_format_idc | ue(v) |
|   if( chroma_format_idc = = 3 ) | |
|     separate_colour_plane_flag | u(1) |
|   pic_width_in_luma_samples | ue(v) |
|   pic_height_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   bit_depth_luma_minus8 | ue(v) |
|   bit_depth_chroma_minus8 | ue(v) |
|   log2_max_pic_order_cnt_lsb_minus4 | ue(v) |
|   sps_sub_layer_ordering_info_present_flag | u(1) |
|   for( i = ( sps_sub_layer_ordering_info_present_flag ? 0 : sps_max_sub_layers_minus1 ); | |
|     i <= sps_max_sub_layers_minus1; i++ ) { | |
|     sps_max_dec_pic_buffeting_minus1[ i ] | ue (v) |
|     sps_max_num_reorder_pics[ i ] | ue (v) |
|     sps_max_latency_increase_plus1[ i ] | ue (v) |
|   } | |
|   long_term_ref_pics_flag | u(1) |
|   sps_idr_rpl_present_flag | u(1) |
|   rpl1_same_as_rpl0_flag | u(1) |
|   for( i = 0; i < !rpl1_same_as_rpl0_flag ? 2 : 1; i++ ) { | |
|     num_ref_pic_lists_in_sps[ i ] | ue (v) |
|     for( j = 0; j < num_ref_pic_lists_in_sps[ i ]; j++) | |
|       ref_pic_list_struct( i, j ) | |
|   } | |
|   qtbtt_dual_tree_intra_flag | u(1) |
|   log2_ctu_size_minus2 | ue(v) |
|   log2_min_luma_coding_block_size_minus2 | ue(v) |
|   partition_constraints_overtide_enabled_flag | u(1) |
|   sps_log2_diff_min_qt_min_cb_intra_slice_luma | ue(v) |
|   sps_log2_diff_min_qt_min_cb_inter_slice | ue(v) |
|   sps_max_mtt_hierarchy_depth_inter_slice | ue(v) |
|   sps_max_mtt_hierarchy_depth_intra_slice_luma | ue(v) |
|   if( sps_max_mtt_hierarchy_depth_intra_slice_luma != 0 ) { | |
|     sps_log2_diff_max_bt_min_qt_intra_slice_luma | ue(v) |
|     sps_log2_diff max_tt_min_qt_intra_slice_luma | ue(v) |
|   } | |
|   if( sps_max_mtt_hierarchy_depth_inter_slices != 0 ) { | |
|     sps_1og2_diff_max_bt_min_qt_inter_slice | ue(v) |
|     sps_log2_diff_max_tt_min_qt_inter_slice | ue(v) |
|   } | |
|   if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if ( sps_max_mtt_hierarchy_depth_intra_slice_chroma ! = 0) { | |
|       sps_log2_diff_max_bt_min_qt_intra_slice_chroma | ue(v) |
|       sps_log2_diff_max_tt_min_qt_intra_slice_chroma | ue(v) |
|     } | |
|   } | |
| ... | |
|   rbsp_trailing_bits( ) | |
| } | | log 2_ctu_size_minus2 plus 2 specifies the luma coding tree block size of each CTU.

log 2_min_luma_coding_block_size_minus2 plus 2 specifies the minimum luma coding block size.

The variables Ctb Log 2SizeY, CtbSizeY, Min Cb Log 2SizeY, Min CbSizeY, Min Tb Log 2SizeY, Max Tb Log 2SizeY, Min CbSizeY, Max TbSizeY, PicWidthInCtbsY, PicHeightInCtbsY, PicSizeInCtbsY, PicWidthIn Min CbsY, PicHeightIn Min CbsY, PicSizeIn Min CbsY, PicSizeInSamplesY, PicWidthInSamplesC and PicHeightInSamplesC are derived as follows:

$$\text{Ctb Log 2Size}Y = \log 2\_ctu\_size\_minus2 + 2 \quad (7\text{-}9)$$

$$\text{CtbSize}Y = 1 << \text{Ctb Log 2Size}Y \quad (7\text{-}10)$$

$$\text{Min Cb Log 2Size}Y = \log 2\_min\_luma\_coding\_block\_size\_minus2 + 2 \quad (7\text{-}11)$$

$$\text{Min CbSize}Y = 1 << \text{Min Cb Log 2Size}Y \quad (7\text{-}12)$$

$$\text{Min Tb Log 2Size}Y = 2 \quad (7\text{-}13)$$

$$\text{Max Tb Log 2Size}Y = 6 \quad (7\text{-}14)$$

$$\text{Min TbSize}Y = 1 << \text{Min Tb Log 2Size}Y \quad (7\text{-}15)$$

$$\text{Max TbSize}Y = 1 << \text{Max Tb Log 2Size}Y \quad (7\text{-}16)$$

$$\text{PicWidthInCtbs}Y = \text{Ceil}(pic\_width\_in\_luma\_samples + \text{CtbSize}Y) \quad (7\text{-}17)$$

PicHeightInCtbsY=Ceil
 (pic_height_in_luma_samples÷CtbSizeY)  (7-18)

PicSizeInCtbsY=PicWidthInCtbsY*PicHeightInCtbsY  (7-19)

PicWidthIn Min CbsY=pic_width_in_luma_samples/
 Min CbSizeY  (7-20)

PicHeightIn Min CbsY=pic_height_in_luma_samples/
 Min CbSizeY  (7-21)

PicSizeIn Min CbsY=PicWidthIn Min
 CbsY*PicHeightIn Min CbsY  (7-22)

PicSizeInSamplesY=pic_width_in_luma_samples*
 pic_height_in_luma_samples  (7-23)

PicWidthInSamplesC=pic_width_in_luma_samples/
 SubWidthC  (7-24)

PicHeightInSamplesC=pic_height_in_luma_samples/
 SubHeightC  (7-25)

2.2.2. CTUs in a Picture

Figure 4B:
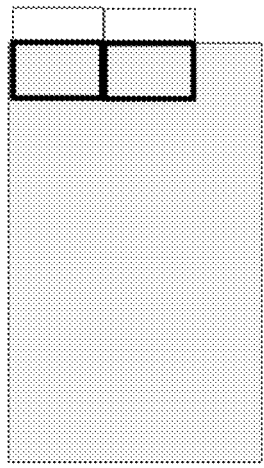
FIGS. 4A-4C show examples of CTBs crossing picture borders, (a) K=M, L<N; (b) K<M, L=N; (c) K<M, L<N.
Figure 4C:
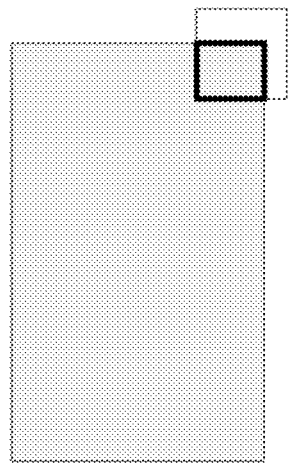
Figure 4A:
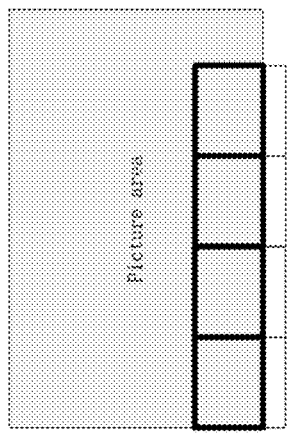

Suppose the CTB/LCU size indicated by M×N (typically M is equal to N, as defined in HEVC/VVC), and for a CTB located at picture (or tile or slice or other kinds of types, picture border is taken as an example) border, K×L samples are within picture border wherein either K<M or L<N. For those CTBs as depicted in FIGS. 4A-4B, the CTB size is still equal to M×N, however, the bottom boundary/right boundary of the CTB is outside the picture. FIG. 4A shows CTBs crossing the bottom picture border. FIG. 4B shows CTBs crossing the right picture border. FIG. 4C shows CTBs crossing the right bottom picture border.

2.3. Coding Flow of a Typical Video Codec

Figure 5:
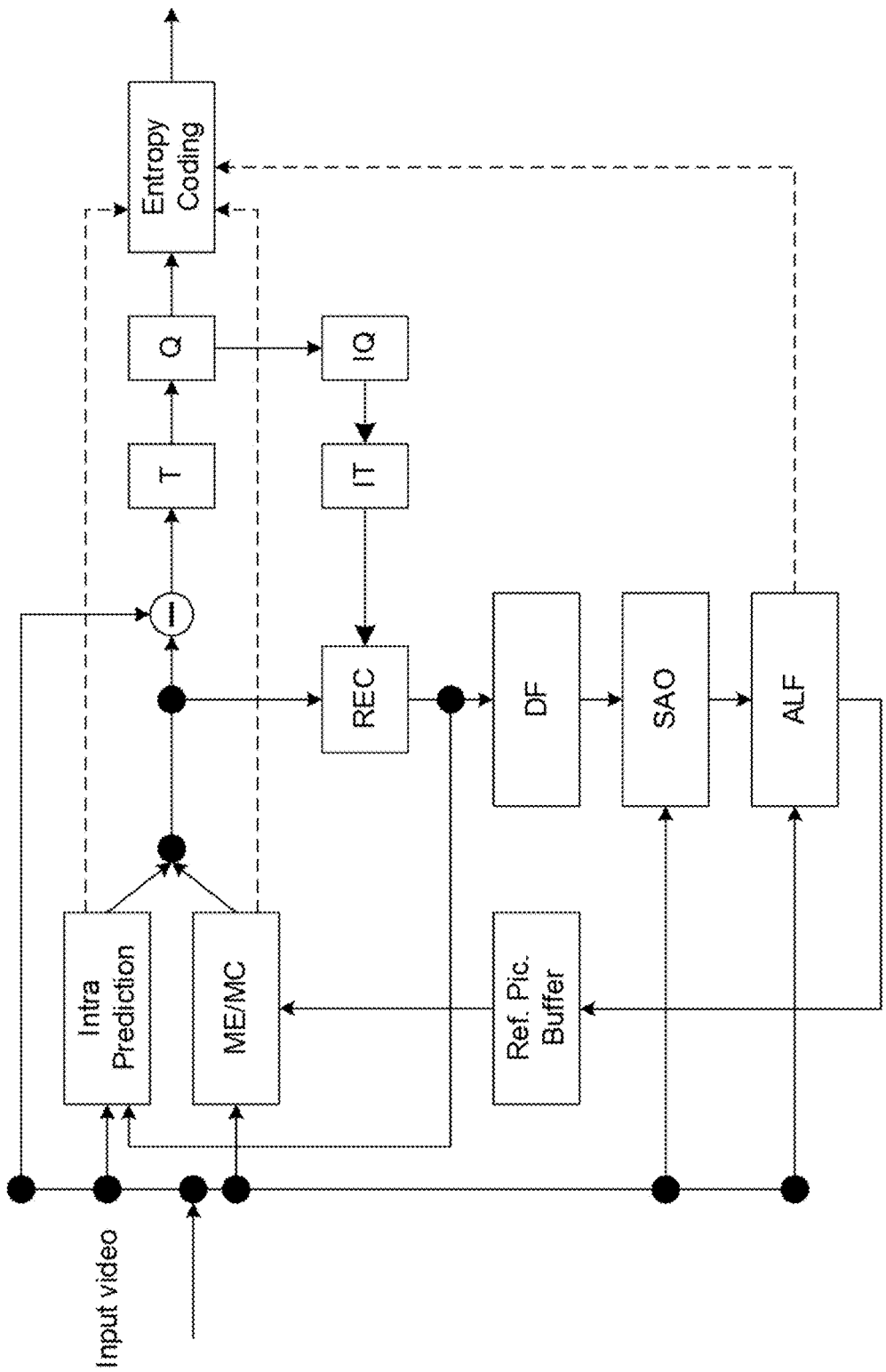
FIG. 5 shows an example of encoder block diagram.
Figure 6:
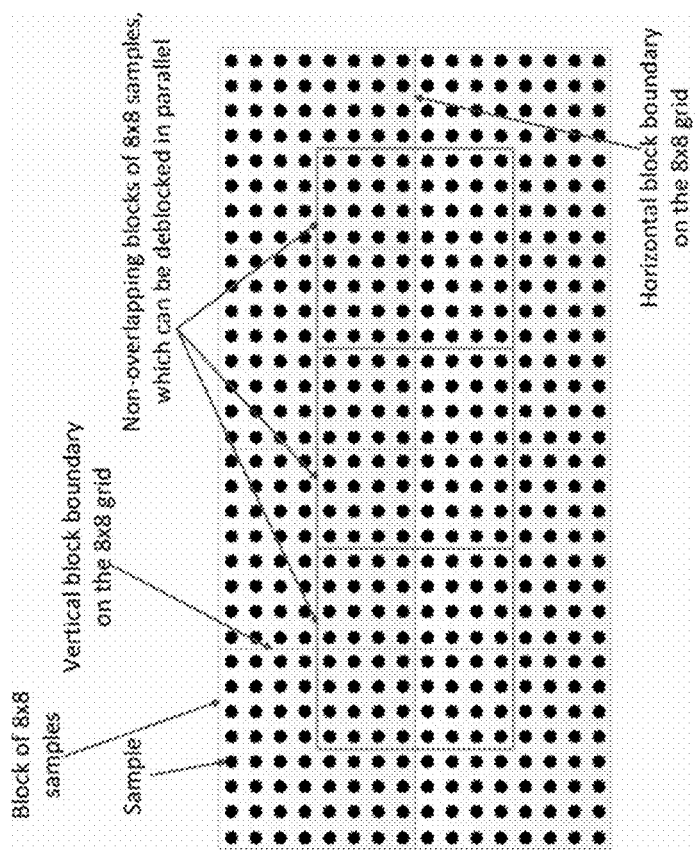
FIG. 6 is an illustration of picture samples and horizontal and vertical block boundaries on the 8×8 grid, and the nonoverlapping blocks of the 8×8 samples, which can be deblocked in parallel.

FIG. 5 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.4. Deblocking Filter (DB)

The Input of DB is the Reconstructed Samples Before In-Loop Filters.

The vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

2.4.1. Boundary Decision

Filtering is applied to 8×8 block boundaries. In addition, it must be a transform block boundary or a coding subblock boundary (e.g., due to usage of Affine motion prediction, ATMVP). For those which are not such boundaries, filter is disabled.

2.4.2. Boundary Strength Calculation

For a transform block boundary/coding subblock boundary, if it is located in the 8×8 grid, it may be filtered and the setting of $bS[xD_i][yD_j]$ (wherein $[xD_i][yD_j]$ denotes the coordinate) for this edge is defined in Table 1 and Table 2, respectively.

TABLE 1

Boundary strength (when SPS IBC is disabled)

| Priority | Conditions | Y | U | V |
|---|---|---|---|---|
| 5 | At least one of the adjacent blocks is intra | 2 | 2 | 2 |
| 4 | TU boundary and at least one of the adjacent blocks has non-zero transform coefficients | 1 | 1 | 1 |
| 3 | Reference pictures or number of MVs (1 for uni-prediction, 2 for bi-prediction) of the adjacent blocks are different | 1 | N/A | N/A |
| 2 | Absolute difference between the motion vectors of same reference picture that belong to the adjacent blocks is greater than or equal to one integer luma sample | 1 | N/A | N/A |
| 1 | Otherwise | 0 | 0 | 0 |

TABLE 2

Boundary strength (when SPS IBC is enabled)

| Priority | Conditions | Y | U | V |
|---|---|---|---|---|
| 8 | At least one of the adjacent blocks is intra | 2 | 2 | 2 |
| 7 | TU boundary and at least one of the adjacent blocks has non-zero transform coefficients | 1 | 1 | 1 |
| 6 | Prediction mode of adjacent blocks is different (e.g., one is IBC, one is inter) | 1 | | |
| 5 | Both IBC and absolute difference between the motion vectors that belong to the adjacent blocks is greater than or equal to one integer luma sample | 1 | N/A | N/A |

TABLE 2-continued

| | Boundary strength (when SPS IBC is enabled) | | | |
|---|---|---|---|---|
| Priority | Conditions | Y | U | V |
| 4 | Reference pictures or number of MVs (1 for uni-prediction, 2 for bi-prediction) of the adjacent blocks are different | 1 | N/A | N/A |
| 3 | Absolute difference between the motion vectors of same reference picture that belong to the adjacent blocks is greater than or equal to one integer luma sample | 1 | N/A | N/A |
| 1 | Otherwise | 0 | 0 | 0 |

2.4.3. Deblocking Decision for Luma Component

Figure 7:
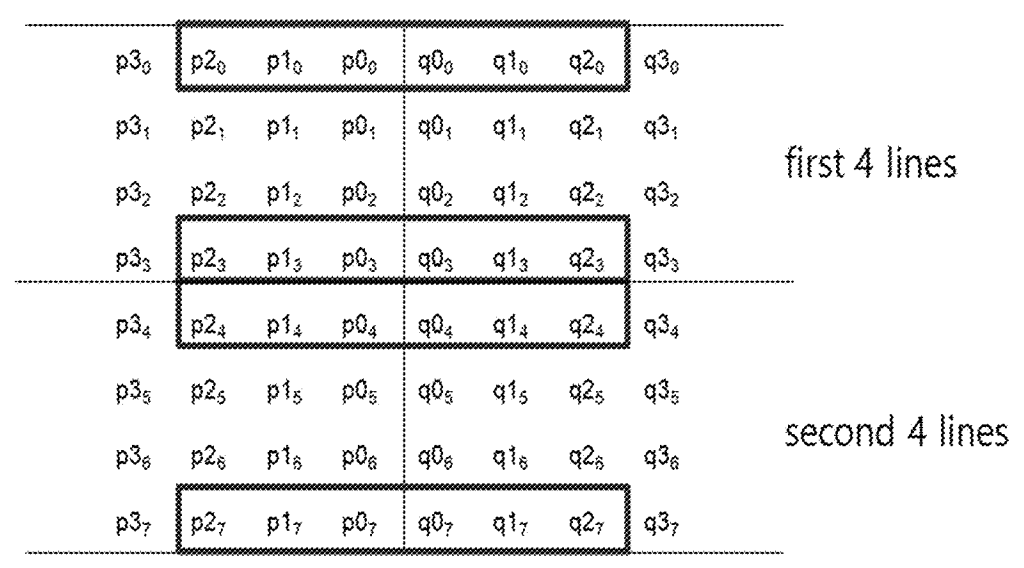

The deblocking decision process is described in this sub-section. FIG. 7 shows—Pixels involved in filter on/off decision and strong/weak filter selection.

Wider-stronger luma filter is filters are used only if all the Condition1, Condition2 and Condition 3 are TRUE.

The condition 1 is the "large block condition". This condition detects whether the samples at P-side and Q-side belong to large blocks, which are represented by the variable bSidePisLargeBlk and bSideQisLargeBlk respectively. The bSidePisLargeBlk and bSideQisLargeBlk are defined as follows.

bSidePisLargeBlk=((edge type is vertical and $p_0$ belongs to CU with width>=32)||(edge type is horizontal and $p_0$ belongs to CU with height>=32))? TRUE: FALSE bSideQisLargeBlk=((edge type is vertical and $q_0$ belongs to CU with width>=32)||(edge type is horizontal and $q_0$ belongs to CU with height>=32))? TRUE: FALSE Based on bSidePisLargeBlk and bSideQisLargeBlk, the condition 1 is defined as follows.

Condition1=(bSidePisLargeBlk bSidePisLargeBlk)? TRUE: FALSE

Next, if Condition 1 is true, the condition 2 will be further checked. First, the following variables are derived:

dp0, dp3, dq0, dq3 are first derived as in HEVC
if (p side is greater than or equal to 32)
  dp0=(dp0+Abs($p5_0-2*p4_0+p3_0$)+1)>>1
  dp3=(dp3+Abs($p5_3-2*p4_3+p3_3$)+1)>>1
if (q side is greater than or equal to 32)
  dq0=(dq0+Abs($q5_0-2*q4_0+q3_0$)+1)>>1
  dq3=(dq3+Abs($q5_3-2*q4_3+q3_3$)+1)>>1
Condition2=(d<β)? TRUE: FALSE
where d=dp0+dq0+dp3+dq3.

If Condition1 and Condition2 are valid, whether any of the blocks uses sub-blocks is further checked:

```
If (bSidePisLargeBlk)
{
    If (mode block P == SUBBLOCKMODE)
        Sp =5
    else
        Sp =7
}
else
    Sp = 3
If (bSideQisLargeBlk)
{
    If (mode block Q == SUBBLOCKMODE)
        Sq =5
    else
        Sq =7
}
else
    Sq = 3
```

Finally, if both the Condition 1 and Condition 2 are valid, the proposed deblocking method will check the condition 3 (the large block strong filter condition), which is defined as follows. In the Condition3 StrongFilterCondition, the following variables are derived:

```
dpq is derived as in HEVC.
sp3 = Abs( p3 − p0 ), derived as in HEVC
if (p side is greater than or equal to 32)
    if(Sp==5)
        sp3 = ( sp3 + Abs( p5 − p3 ) + 1 ) >> 1
    else
        sp3 = ( sp3 + Abs( p7 − p3 ) + 1 ) >> 1
sq3 = Abs( q0 − q3 ), derived as in HEVC
if (q side is greater than or equal to 32)
    If(Sq==5)
        sq3 = ( sq3 + Abs( q5 − q3 ) + 1 ) >> 1
    else
        sq3 = ( sq3 + Abs( q7 − q3 ) + 1 ) >> 1
```

As in HEVC, StrongFilterCondition=(dpq is less than (β>>2), $sp_3+sq_3$ is less than (3*β>>5), and Abs($p_0-q_0$) is less than ($5*t_C+1$)>>1)? TRUE: FALSE.

2.4.4. Stronger Deblocking Filter for Luma (Designed for Larger Blocks)

Bilinear filter is used when samples at either one side of a boundary belong to a large block. A sample belonging to a large block is defined as when the width>=32 for a vertical edge, and when height>=32 for a horizontal edge.

The bilinear filter is listed below.

Block boundary samples pi for i=0 to Sp-1 and qi for j=0 to Sq-1 (pi and qi are the i-th sample within a row for filtering vertical edge, or the i-th sample within a column for filtering horizontal edge) in HEVC deblocking described above) are then replaced by linear interpolation as follows:

$p_i'=(f_i*Middle_{s,t}+(64-f_i)*P_s+32)>>6)$, clipped to $p_i \pm tcPD_i$ $q_j'=(g_j*Middle_{s,t}+(64-g_j)*Q_s+32)>>6)$, clipped to $q_j \pm tcPD_j$ where $tcPD_i$ and $tcPD_j$ term is a position dependent clipping described in Section 2.4.7 and $g_j$, $f_i$, $Middle_{s,t}$, $P_s$ and $Q_s$ are given below:

2.4.5. Deblocking Control for Chroma

The chroma strong filters are used on both sides of the block boundary. Here, the chroma filter is selected when both sides of the chroma edge are greater than or equal to 8 (chroma position), and the following decision with three conditions are satisfied: the first one is for decision of boundary strength as well as large block. The proposed filter can be applied when the block width or height which orthogonally crosses the block edge is equal to or larger than 8 in chroma sample domain. The second and third one is basically the same as for HEVC luma deblocking decision, which are on/off decision and strong filter decision, respectively.

In the first decision, boundary strength (bS) is modified for chroma filtering and the conditions are checked sequentially. If a condition is satisfied, then the remaining conditions with lower priorities are skipped.

Chroma deblocking is performed when bS is equal to 2, or bS is equal to 1 when a large block boundary is detected.

The second and third condition is basically the same as HEVC luma strong filter decision as follows.

In the second condition:

d is then derived as in HEVC luma deblocking.

The second condition will be TRUE when d is less than $\beta$.

In the third condition StrongFilterCondition is derived as follows:

dpq is derived as in HEVC.

$sp_3=Abs(p_3-p_0)$, derived as in HEVC $sq_3=Abs(q_0-q_3)$, derived as in HEVC

As in HEVC design, StrongFilterCondition=(dpq is less than ($\beta$>>2), $sp_3+sq_3$ is less than ($\beta$>>3), and $Abs(p_0-q_0)$ is less than $(5*t_C+1)>>1$)

2.4.6. Strong Deblocking Filter for Chroma

The following strong deblocking filter for chroma is defined:

$p_2'=(3*p_3+2*p_2+p_1+p_0+q_0+4)>>3$ $p_1'=(2*p_3+p_2+2*p_1+p_0+q_0+q_1+4)>>3$ $p_0'=(p_3+p_2+p_1+2*p_0+q_0+q_1+q_2+4)>>3$

The proposed chroma filter performs deblocking on a 4×4 chroma sample grid.

2.4.7. Position Dependent Clipping

The position dependent clipping tcPD is applied to the output samples of the luma filtering process involving strong and long filters that are modifying 7, 5 and 3 samples at the boundary. Assuming quantization error distribution, it is proposed to increase clipping value for samples which are expected to have higher quantization noise, thus expected to have higher deviation of the reconstructed sample value from the true sample value.

For each P or Q boundary filtered with asymmetrical filter, depending on the result of decision-making process in section 2.4.2, position dependent threshold table is selected from two tables (i.e., Tc7 and Tc3 tabulated below) that are provided to decoder as a side information:

Tc7={6, 5, 4, 3, 2, 1, 1}; Tc3={6, 4, 2};

tcPD=(Sp==3)? Tc3: Tc7;

tcQD=(Sq==3)? Tc3: Tc7;

For the P or Q boundaries being filtered with a short symmetrical filter, position dependent threshold of lower magnitude is applied:

Tc3={3, 2, 1};

Following defining the threshold, filtered $p'_i$ and $q'_i$ sample values are clipped according to tcP and tcQ clipping values:

$p''_i=Clip3(p'_i+tcP_i, p'_i-tcP_i, p'_i)$;

$q''_j=Clip3(q'_j+tcQ_j, q'_j-tcQ_j, q'_j)$;

where $p'_i$ and $q'_i$ are filtered sample values, $p''_i$ and $q''_j$ are output sample value after the clipping and $tcP_i$, $tcP_i$ are clipping thresholds that are derived from the VVC tc parameter and tcPD and tcQD. The function Clip3 is a clipping function as it is specified in VVC.

2.4.8. Sub-Block Deblocking Adjustment

To enable parallel friendly deblocking using both long filters and sub-block deblocking the long filters is restricted to modify at most 5 samples on a side that uses sub-block deblocking (AFFINE or ATMVP or DMVR) as shown in the luma control for long filters. Additionally, the sub-block deblocking is adjusted such that that sub-block boundaries on an 8×8 grid that are close to a CU or an implicit TU boundary is restricted to modify at most two samples on each side.

Following applies to sub-block boundaries that not are aligned with the CU boundary.

```
If (mode block Q == SUBBLOCKMODE && edge !=0) {
    if (!(implicitTU && (edge == (64 / 4))))
        if (edge == 2 || edge == (orthogonalLength - 2) || edge == (56 / 4) || edge == (72 / 4))
            Sp = Sq = 2;
        else
            Sp = Sq = 3;
    else
        Sp = Sq = bSideQisLargeBlk ? 5:3
}
```

Where edge equal to 0 corresponds to CU boundary, edge equal to 2 or equal to orthogonalLength-2 corresponds to sub-block boundary 8 samples from a CU boundary etc. Where implicit TU is true if implicit split of TU is used.

2.5. SAO

The input of SAO is the reconstructed samples after DB. The concept of SAO is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC and VVC, the region (the unit for SAO parameters signaling) is defined to be a CTU.

Two SAO types that can satisfy the requirements of low complexity are adopted in HEVC. Those two types are edge offset (EO) and band offset (BO), which are discussed in further detail below. An index of an SAO type is coded (which is in the range of [0, 2]). For EO, the sample classification is based on comparison between current samples and neighboring samples according to 1-D directional patterns: horizontal, vertical, 135° diagonal, and 45° diagonal.

Figure 8:
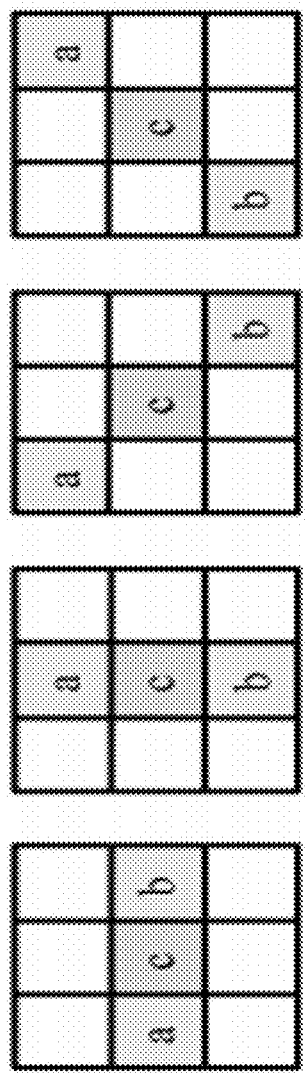
FIG. 8 shows Four 1-D directional patterns for EO sample classification: horizontal (EO class=0), vertical (EO class=1), 135° diagonal (EO class=2), and 45° diagonal (EO class=3).

FIG. 8 shows four 1-D directional patterns for EO sample classification: horizontal (EO class=0), vertical (EO class=1), 135° diagonal (EO class=2), and 45° diagonal (EO class=3)

For a given EO class, each sample inside the CTB is classified into one of five categories. The current sample value, labeled as "c," is compared with its two neighbors along the selected 1-D pattern. The classification rules for each sample are summarized in Table I. Categories 1 and 4 are associated with a local valley and a local peak along the selected 1-D pattern, respectively. Categories 2 and 3 are associated with concave and convex corners along the selected 1-D pattern, respectively. If the current sample does not belong to EO categories 1-4, then it is category 0 and SAO is not applied.

TABLE 3

Sample Classification Rules for Edge Offset

| Category | Condition |
|---|---|
| 1 | c < a and c < b |
| 2 | (c < a && c == b) \|\| (c == a && c < b) |
| 3 | (c > a && c == b) \|\| (c == a && c > b) |
| 4 | c > a && c > b |
| 5 | None of above |

2.6. Geometry Transformation-Based Adaptive Loop Filter in JEM

The input of DB is the reconstructed samples after DB and SAO. The sample classification and filtering process are based on the reconstructed samples after DB and SAO.

In the JEM, a geometry transformation-based adaptive loop filter (GALF) with block-based filter adaption [3] is applied. For the luma component, one among 25 filters is selected for each 2×2 block, based on the direction and activity of local gradients.

2.6.1. Filter Shape

Figure 9:
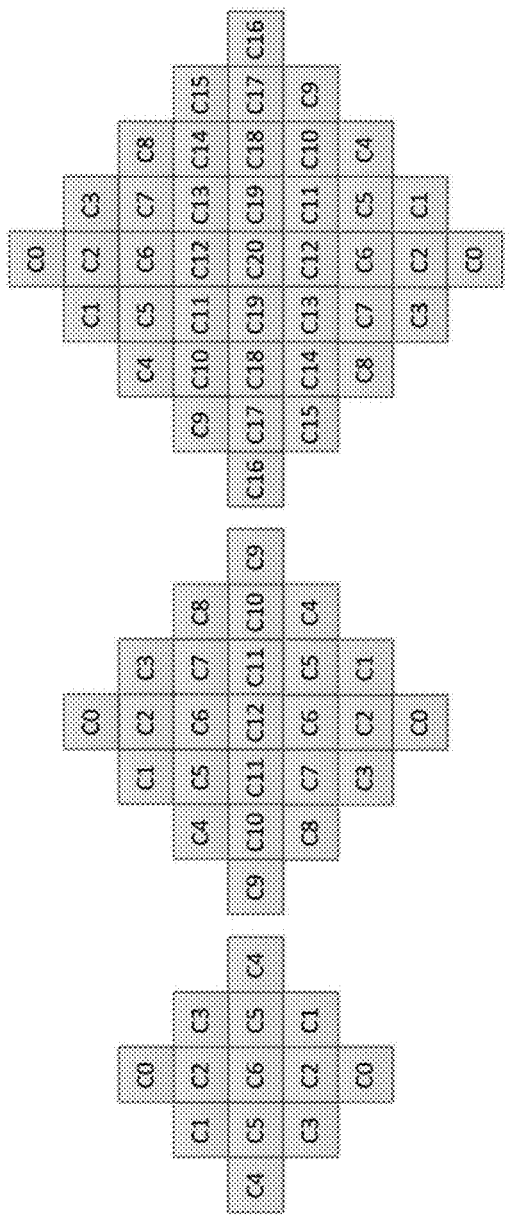
FIG. 9 shows GALF filter shapes (left: 5×5 diamond, middle: 7×7 diamond, right: 9×9 diamond).

In the JEM, up to three diamond filter shapes (as shown in FIG. 9) can be selected for the luma component. An index is signaled at the picture level to indicate the filter shape used for the luma component. Each square represents a sample, and Ci (i being 0~6 (left), 0~12 (middle), 0~20 (right)) denotes the coefficient to be applied to the sample. For chroma components in a picture, the 5×5 diamond shape is always used.

2.6.1.1. Block Classification

Each 2×2 block is categorized into one out of 25 classes. The classification index C is derived based on its directionality D and a quantized value of activity $\hat{A}$, as follows:

$$C = 5D + \hat{A}. \quad (1)$$

To calculate D and $\hat{A}$, gradients of the horizontal, vertical and two diagonal direction are first calculated using 1-D Laplacian:

$$g_v = \sum_{k=i-2}^{i+3} \sum_{l=j-2}^{j+3} V_{k,l}, \ V_{k,l} = |2R(k,l) - R(k, l-1) - R(k, l+1)|, \quad (2)$$

$$g_h = \sum_{k=i-2}^{i+3} \sum_{l=j-2}^{j+3} H_{k,l}, \ H_{k,l} = |2R(k,l) - R(k-1, l) - R(k+1, l)|, \quad (3)$$

$$g_{d1} = \sum_{k=i-2}^{i+3} \sum_{l=j-3}^{j+3} D1_{k,l}, \quad (4)$$

$$D1_{k,l} = |2R(k,l) - R(k-1, l-1) - R(k+1, l+1)|$$

$$g_{d2} = \sum_{k=i-2}^{i+3} \sum_{j=j-2}^{j+3} D2_{k,l}, \quad (5)$$

$$D2_{k,l} = |2R(k,l) - R(k-1, l+1) - R(k+1, l-1)|$$

Indices i and j refer to the coordinates of the upper left sample in the 2×2 block and R(i, j) indicates a reconstructed sample at coordinate (i, j).

Then D maximum and minimum values of the gradients of horizontal and vertical directions are set as:

$$g_{h,v}^{max} = \max(g_h, g_v), g_{h,v}^{min} = \min(g_h, g_v), \quad (6)$$

and the maximum and minimum values of the gradient of two diagonal directions are set as:

$$g_{d0,d1}^{max} = \max(g_{d0}, g_{d1}), g_{d0,d1}^{min} = \min(g_{d0}, g_{d1}), \quad (7)$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated as:

$$A = \sum_{k=i-2}^{i+3} \sum_{l=j-2}^{j+3} (V_{k,l} + H_{k,l}). \quad (8)$$

A is further quantized to the range of 0 to 4, inclusively, and the quantized value is denoted as $\hat{A}$. For both chroma components in a picture, no classification method is applied, i.e. a single set of ALF coefficients is applied for each chroma component.

2.6.1.2. Geometric Transformations of Filter Coefficients

Figures 10A, 10B, 10C:
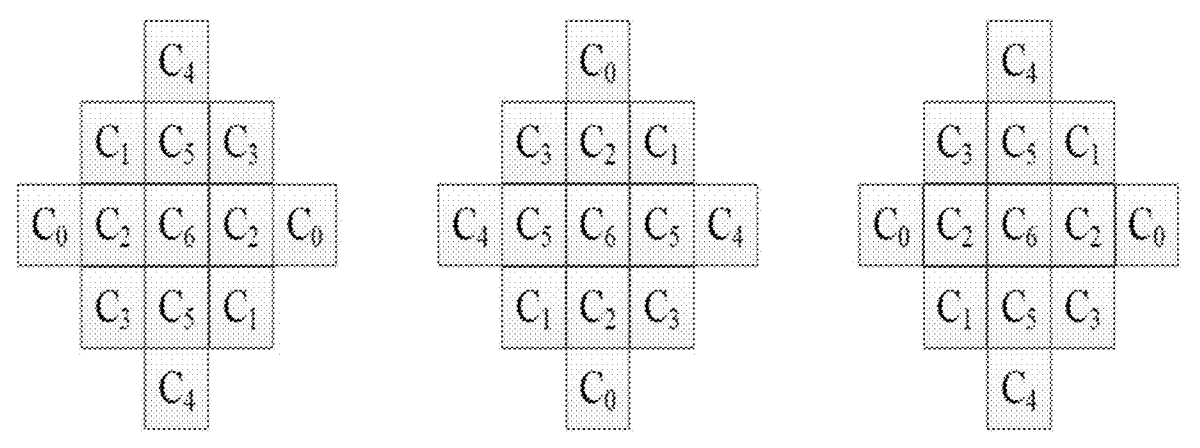

FIGS. 10A-10C show relative coordinator for the 5×5 diamond filter support (diagonal, vertical flip and rotation, respectively).

Before filtering each 2×2 block, geometric transformations such as rotation or diagonal and vertical flipping are applied to the filter coefficients f (k, l), which is associated with the coordinate (k, l), depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

Diagonal: $f_D(k,l) = f(l,k)$,

Vertical flip: $f_V(k,l) = f(k, K-l-1)$,

Rotation: $f_R(k,l) = f(K-l-1, k)$. $\quad (9)$ where K is the size of the filter and $0 \leq k$, $l \leq K-1$ are coefficients coordinates, such that location (0,0) is at the upper left corner and location (K-1, K-1) is at the lower right corner. The transformations are applied to the filter coefficients f (k, l) depending on gradient values calculated for that block. The relationship between the transformation and the four gradients of the four directions are summarized in Table 4. FIG. 9 shows the transformed coefficients for each position based on the 5×5 diamond.

TABLE 4

Mapping of the gradient calculated for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

2.6.1.3. Filter Parameters Signaling

In the JEM, GALF filter parameters are signaled for the first CTU, i.e., after the slice header and before the SAO parameters of the first CTU. Up to 25 sets of luma filter coefficients could be signaled. To reduce bits overhead, filter coefficients of different classification can be merged. Also, the GALF coefficients of reference pictures are stored and allowed to be reused as GALF coefficients of a current picture. The current picture may choose to use GALF coefficients stored for the reference pictures and bypass the GALF coefficients signaling. In this case, only an index to one of the reference pictures is signaled, and the stored GALF coefficients of the indicated reference picture are inherited for the current picture.

To support GALF temporal prediction, a candidate list of GALF filter sets is maintained. At the beginning of decoding a new sequence, the candidate list is empty. After decoding one picture, the corresponding set of filters may be added to the candidate list. Once the size of the candidate list reaches the maximum allowed value (i.e., 6 in current JEM), a new set of filters overwrites the oldest set in decoding order, and that is, first-in-first-out (FIFO) rule is applied to update the candidate list. To avoid duplications, a set could only be added to the list when the corresponding picture doesn't use GALF temporal prediction. To support temporal scalability, there are multiple candidate lists of filter sets, and each candidate list is associated with a temporal layer. More specifically, each array assigned by temporal layer index (TempIdx) may compose filter sets of previously decoded pictures with equal to lower TempIdx. For example, the k-th array is assigned to be associated with TempIdx equal to k, and it only contains filter sets from pictures with TempIdx smaller than or equal to k. After coding a certain picture, the filter sets associated with the picture will be used to update those arrays associated with equal or higher TempIdx.

Temporal prediction of GALF coefficients is used for inter coded frames to minimize signaling overhead. For intra frames, temporal prediction is not available, and a set of 16 fixed filters is assigned to each class. To indicate the usage of the fixed filter, a flag for each class is signaled and if required, the index of the chosen fixed filter. Even when the fixed filter is selected for a given class, the coefficients of the adaptive filter f (k, l) can still be sent for this class in which case the coefficients of the filter which will be applied to the reconstructed image are sum of both sets of coefficients.

The filtering process of luma component can controlled at CU level. A flag is signaled to indicate whether GALF is applied to the luma component of a CU. For chroma component, whether GALF is applied or not is indicated at picture level only.

2.6.1.4. Filtering Process

At decoder side, when GALF is enabled for a block, each sample R(i, j) within the block is filtered, resulting in sample value R'(i, j) as shown below, where L denotes filter length, $f_{m,n}$ represents filter coefficient, and f(k, l) denotes the decoded filter coefficients.

$$R'(i,j)=\Sigma_{k=-L/2}^{L/2}\Sigma_{l=-L/2}^{L/2}f(k,l)\times R(i+k,j+l) \quad (10)$$

Figure 11:
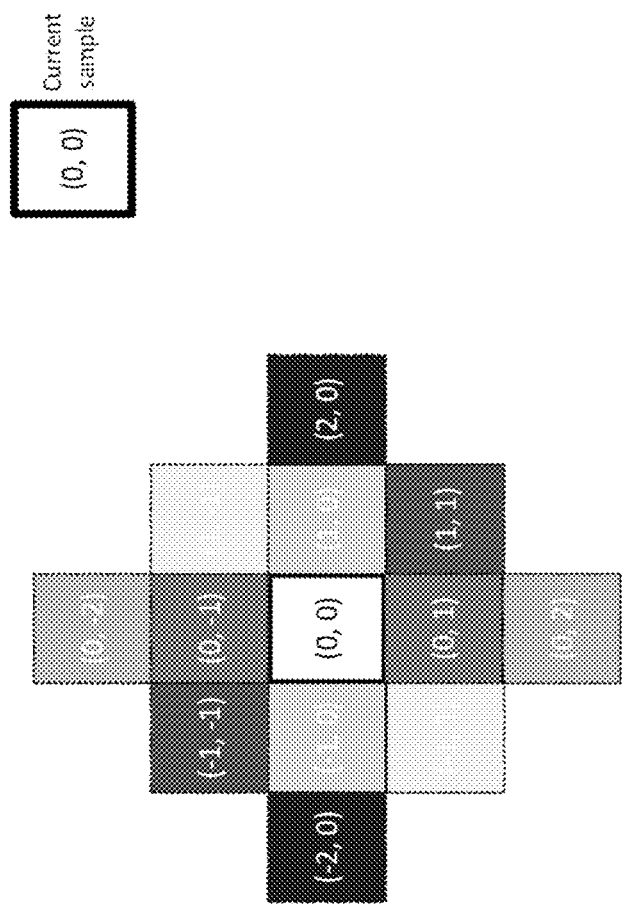
FIG. 11 shows examples of relative coordinates for the 5×5 diamond filter support.

FIG. 11 shows an example of relative coordinates used for 5×5 diamond filter support supposing the current sample's coordinate (i, j) to be (0, 0). Samples in different coordinates filled with the same color are multiplied with the same filter coefficients.

2.7. Geometry Transformation-Based Adaptive Loop Filter (GALF) in VVC 2.7.1. GALF in VTM-4

In VTM4.0, the filtering process of the Adaptive Loop Filter, is performed as follows:

$$O(x,y)=\Sigma_{(i,j)}w(i,j)\cdot I(x+i,y+j), \quad (11)$$

where samples I(x+i, y+j) are input samples, O(x, y) is the filtered output sample (i.e. filter result), and w(i,j) denotes the filter coefficients. In practice, in VTM4.0 it is implemented using integer arithmetic for fixed point precision computations:

$$O(x, y) = \left(\sum_{i=-\frac{L}{2}}^{\frac{L}{2}} \sum_{j=-\frac{L}{2}}^{\frac{L}{2}} w(i, j)\cdot I(x + i, y + j) + 64\right) \gg 7, \quad (12)$$

where L denotes the filter length, and where w(i,j) are the filter coefficients in fixed point precision.

The current design of GALF in VVC has the following major changes compared to that in JEM:
1) The adaptive filter shape is removed. Only 7×7 filter shape is allowed for luma component and 5×5 filter shape is allowed for chroma component.
2) Signaling of ALF parameters in removed from slice/picture level to CTU level.
3) Calculation of class index is performed in 4×4 level instead of 2×2. In addition, as proposed in JVET-L0147, sub-sampled Laplacian calculation method for ALF classification is utilized. More specifically, there is no need to calculate the horizontal/vertical/45 diagonal/135 degree gradients for each sample within one block. Instead, 1:2 subsampling is utilized.

2.8. Non-Linear ALF in Current VVC 2.8.1. Filtering Reformulation

Equation (111) can be reformulated, without coding efficiency impact, in the following expression:

$$O(x,y)=I(x,y)+\Sigma_{(i,j)\neq(0,0)}w(i,j)\cdot(I(x+i,y+j)-I(x,y)), \quad (13)$$

where w(i,j) are the same filter coefficients as in equation (11) [excepted w(0, 0) which is equal to 1 in equation (13) while it is equal to 1−$\Sigma_{(i,j)\neq(0,0)}$w(i,j) in equation (11)]. Using this above filter formula of (13), VVC introduces the non-linearity to make ALF more efficient by using a simple clipping function to reduce the impact of neighbor sample values (I(x+i, y+j)) when they are too different with the current sample value (I(x, y)) being filtered. More specifically, the ALF filter is modified as follows:

$$O'(x,y)=I(x,y)+\Sigma_{(i,j)\neq(0,0)}w(i,j)\cdot K(I(x+i,y+j)-I(x,y), k(i,j)), \quad (14)$$

where K(d,b)=min (b, max(−b,d)) is the clipping function, and k(i,j) are clipping parameters, which depends on the (i,j) filter coefficient. The encoder performs the optimization to find the best k(i,j).

In the JVET-N0242 implementation, the clipping parameters k(i,j) are specified for each ALF filter, one clipping value is signaled per filter coefficient. It means that up to 12 clipping values can be signaled in the bitstream per Luma filter and up to 6 clipping values for the Chroma filter.

In order to limit the signaling cost and the encoder complexity, only 4 fixed values which are the same for INTER and INTRA slices are used.

Because the variance of the local differences is often higher for Luma than for Chroma, two different sets for the Luma and Chroma filters are applied. The maximum sample value (here 1024 for 10 bits bit-depth) in each set is also introduced, so that clipping can be disabled if it is not necessary.

The sets of clipping values used in the JVET-N0242 tests are provided in the Table 5. The 4 values have been selected by roughly equally splitting, in the logarithmic domain, the full range of the sample values (coded on 10 bits) for Luma, and the range from 4 to 1024 for Chroma.

More precisely, the Luma table of clipping values have been obtained by the following formula:

$$AlfClip_L = \left\{ \text{round}\left(\left((M)^{\frac{1}{N}}\right)^{N-n+1}\right) \text{ for } n \in 1...N] \right\}, \text{ with} \quad (15)$$

$M = 2^{10}$ and $N = 4$.

Similarly, the Chroma tables of clipping values is obtained according to the following formula:

$$AlfClip_C = \left\{ \text{round}\left(A \cdot \left(\left(\frac{M}{A}\right)^{\frac{1}{N-1}}\right)^{N-n}\right) \text{ for } n \in 1...N] \right\}, \text{ with} \quad (16)$$

$M = 2^{10}$, $N = 4$ and $A = 4$.

TABLE 5

| Authorized clipping values | |
|---|---|
| | INTRA/INTER tile group |
| LUMA | { 1024, 181, 32, 6 } |
| CHROMA | { 1024, 161, 25, 4 } |

The selected clipping values are coded in the "alf_data" syntax element by using a Golomb encoding scheme corresponding to the index of the clipping value in the above Table 5. This encoding scheme is the same as the encoding scheme for the filter index.

2.9. Convolutional Neural Network-Based Loop Filters for Video Coding 2.9.1. Convolutional Neural Networks In deep learning, a convolutional neural network (CNN, or ConvNet) is a class of deep neural networks, most commonly applied to analyzing visual imagery. They have very successful applications in image and video recognition/processing, recommender systems, image classification, medical image analysis, natural language processing.

CNNs are regularized versions of multilayer perceptrons. Multilayer perceptrons usually mean fully connected networks, that is, each neuron in one layer is connected to all neurons in the next layer. The "fully-connectedness" of these networks makes them prone to overfitting data. Typical ways of regularization include adding some form of magnitude measurement of weights to the loss function. CNNs take a different approach towards regularization: they take advantage of the hierarchical pattern in data and assemble more complex patterns using smaller and simpler patterns. Therefore, on the scale of connectedness and complexity, CNNs are on the lower extreme.

CNNs use relatively little pre-processing compared to other image classification/processing algorithms. This means that the network learns the filters that in traditional algorithms were hand-engineered. This independence from prior knowledge and human effort in feature design is a major advantage.

2.9.2. Deep Learning for Image/Video Coding

Deep learning-based image/video compression typically has two implications: end-to-end compression purely based on neural networks and traditional frameworks enhanced by neural networks. The first type usually takes an auto-encoder like structure, either achieved by convolutional neural networks or recurrent neural networks. While purely relying on neural networks for image/video compression can avoid any manual optimizations or hand-crafted designs, compression efficiency may be not satisfactory. Therefore, works distributed in the second type take neural networks as an auxiliary, and enhance traditional compression frameworks by replacing or enhancing some modules. In this way, they can inherit the merits of the highly optimized traditional frameworks. For example, Li et al. propose a fully connected network for the intra prediction in HEVC. In addition to intra prediction, deep learning is also exploited to enhance other modules. For example, Dai et al. replace the in-loop filters of HEVC with a convolutional neural network and achieve promising results (see Yuanying Dai, Dong Liu, and Feng Wu. 2017. A convolutional neural network approach for post-processing in HEVC intra coding. In MMM. Springer, 28-39). The work in reference material (see Rui Song, Dong Liu, Houqiang Li, and Feng Wu. 2017. Neural network-based arithmetic coding of intra prediction modes in HEVC. In VCIP. IEEE, 1-4) applies neural networks to improve the arithmetic coding engine.

2.9.3. Convolutional Neural Network Based In-Loop Filtering

In lossy image/video compression, the reconstructed frame is an approximation of the original frame, since the quantization process is not invertible and thus incurs distortion to the reconstructed frame. To alleviate such distortion, a convolutional neural network could be trained to learn the mapping from the distorted frame to the original frame. In practice, training must be performed prior to deploying the CNN-based in-loop filtering.

2.9.3.1. Training

The purpose of the training processing is to find the optimal value of parameters including weights and bias.

First, a codec (e.g. HM, JEM, VTM, etc.) is used to compress the training dataset to generate the distorted reconstruction frames.

Then the reconstructed frames are fed into the CNN and the cost is calculated using the output of CNN and the groundtruth frames (original frames). Commonly used cost functions include SAD (Sum of Absolution Difference) and MSE (Mean Square Error). Next, the gradient of the cost with respect to each parameter is derived through the back propagation algorithm. With the gradients, the values of the parameters can be updated. The above process repeats until the convergence criteria is met. After completing the training, the derived optimal parameters are saved for use in the inference stage.

2.9.3.2. Convolution Process

During convolution, the filter is moved across the image from left to right, top to bottom, with a one-pixel column change on the horizontal movements, then a one-pixel row change on the vertical movements. The amount of movement between applications of the filter to the input image is referred to as the stride, and it is almost always symmetrical in height and width dimensions. The default stride or strides in two dimensions is (1,1) for the height and the width movement.

Figure 12B:
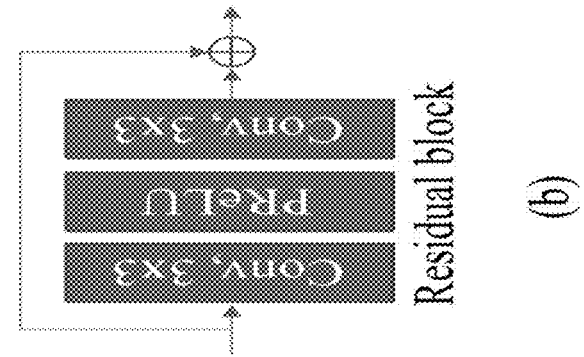
FIGS. 12A and 12B show architecture of the proposed CNN filter.

In most of deep convolutional neural networks, residual blocks are utilized as the basic module and stacked several times to construct the final network wherein in one example, the residual block is obtained by combining a convolutional layer, a ReLU/PReLU activation function and a convolutional layer as shown in FIG. 12B.

2.9.3.3. Inference

During the inference stage, the distorted reconstruction frames are fed into CNN and processed by the CNN model whose parameters are already determined in the training stage. The input samples to the CNN can be reconstructed samples before or after DB, or reconstructed samples before or after SAO, or reconstructed samples before or after ALF.

3. Technical Problems Solved By Disclosed Technical Solutions

The current CNN-based loop filtering has the following problems:

1. The input samples to the CNN are filtered by one or more traditional loop filters including DB, SAO or ALF. Those filtering processes may incur information loss.
2. CNN-based loop filtering does not make fully use of available information, e.g. prediction, partition and other modes, which may be beneficial to the filtering.
3. The training process may be sub-optimal, since the cost function is non-convex and thus very difficult to optimize.
4. CNN-based loop filters in prior-arts are utilized on all of reconstructed frames, causing the frames coded later to be overly filtered
   a. For example, in the Random Access (RA) configuration, blocks in frames within high temporal layers may choose skip mode with a large probability, which means that the reconstruction of current frame is copied from the previous reconstruction frames. Since the previous frames are filtered using the CNN-based loop filter, applying the CNN-based loop filter on the current frame is equivalent to applying the CNN-filter twice on same content.
5. Fixed stride (e.g., 1×1) is utilized. However, other strides can be utilized, which has an effect both on how the filter is applied to the image and, in turn, the size of the resulting feature map.

4. A Listing of Technical Solutions

The listing below should be considered as examples to explain general concepts. These items should not be interpreted in a narrow way. Furthermore, these items can be combined in any manner.

One or more convolutional neural network (CNN) filter models are trained as an in-loop filter or post-processing method for reducing the distortion incurred during compression. The interaction between the CNN filtering and the non-deep learning-based filtering method denoted by NDLF, controlling of our CNN filtering method, CNN filter models will be discussed in this invention. In one example, the NDLF may include one or more of Deblocking filter, SAO, ALF, CC-ALF, LMCS, bilateral filter, transform-domain filtering method, etc. al. On interactions with NDLFs 1. The proposed CNN filter may be exclusively used, i.e., when the CNN filter is applied, then one or multiple kinds of the NDLF may not applied any more, or vice versa.
   a. In one example, the proposed CNN-based in loop filters are used exclusively with all kinds of NDLFs,
      i. In one example, the original loop filters, such as DB, SAO, ALF, and CC-ALF are all turned off when the CNN filters are applied.
   b. In one example, the proposed CNN-based filters are used exclusively with certain NDLF.
      i. In one example, the CNN filter may be applied when ALF is disabled.
      ii. In one example, the CNN filter may be applied to chroma components when CC-ALF is disabled.
      iii. Alternatively, the ALF may be applied when the CNN filter is disabled.
      iv. Alternatively, the CC-ALF may be applied when the CNN filter is disabled for a chroma component.
   c. In one example, suppose a first kind of NDLF is determined to be turned off when CNN-based filtering is applied, then the information related to the first kind of NDLF is not signaled in case the CNN based filtering is turned on.
      i. In one example, the first kind of NDLF is inferred to be turned off when the information related to the first kind of NDLF is not signaled in case the CNN based filtering is turned on.
      ii. Alternatively, the information related to the first kind of NDLF is signaled, but it is required that the information should indicate the first kind of NDLF is not signaled in case the CNN based filtering is turned on.
      iii. Alternatively, the information related to the first kind of NDLF is signaled, but it is required that the information should indicate the first kind of NDLF is not applied in case the CNN based filtering is turned on.
   d. In one example, suppose the CNN filter is determined to be turned off when a first kind of NDLF is applied, then the information related to the CNN filter is not signaled in case the first kind of NDLF is turned on.
      i. In one example, the CNN filter is inferred to be turned off when the information related to the CNN filter is not signaled in case the first kind of NDLF is turned on.
      ii. Alternatively, the information related to the CNN filter is signaled, but it is required that the information should indicate the CNN filter is not applied in case the first kind of NDLF is turned on.
   e. In one example, the above methods may be applied to a video unit, e.g. CTU/CTB, a CTU/CTB row, a slice, a tile, a picture, a sequence, a subpicture.

2. The proposed CNN filter may be used together with NDLFs.
   a. In one example, the proposed CNN filter may be applied before or after a given NDLF (e.g., DB/SAO/ALF/CC-ALF).
   b. In one example, for a given video unit (e.g., a sequence/picture/subpicture/slice/tile/CTU/CTB/CU/PU/TU), the CNN filter may be applied when the NDLFs are not applied.
      i. In one example, for samples wherein a kind of NDLF (such as ALF/CC-ALF) is disabled, the CNN filter may be applied.
      ii. In one example, for samples wherein CNN filtering is disabled, a kind of NDLF (such as ALF/CC-ALF) may be applied.

On Usage of CNN Filtering

3. In one example, the proposed CNN-based filters may be applied to certain slice/picture types, certain temporal layers, or certain slices/picture according to reference picture list information.
   a. In one example, the CNN filter is applied on I slice, DB, SAO, ALF, and CC-AFL are turned off for I slice through high level syntax.
   b. In one example, the CNN filter is applied on B slice with temporal id equal to 0, DB, SAO, ALF, and CC-ALF are turned off for B slice with temporal id equal to 0 through high level syntax.

4. Whether and/or how to use CNN filters (denoted as CNN information) may depend on video standard profiles or levels.
5. Whether and/or how to use CNN filters (denoted as CNN information) may be controlled at a video unit (e.g., sequence/picture/slice/tile/brick/subpicture/CTU/CTU row/one or multiple CUs or CTUs/CTBs) level.
   a. CNN information may comprise
      i. indication of enabling/disabling the CNN filters.
      ii. Which kind of CNN filter is applied.
      iii. CNN filtering parameters.
      iv. CNN models
      v. Stride for a convolutional layer
      vi. Precision of CNN parameters
      vii. Indication of how to map decimal precision to integer precision
   b. In one example, CNN information may be signaled in the video unit level.
      i. In one example, the CNN information may be signaled in SPS/PPS/Picture header/Slice header/CTU/CTB.
      ii. In one example, the CNN information may be conditionally signaled, e.g., according to the usage of NDLFs.
         1. In one example, when a NDLF is applied, the CNN information may not be signaled.
            a. CNN filter may be inferred to be disabled in such a case.
   c. Alternatively, usage of the CNN filter may be implicitly derived, e.g., derived on-the-fly according to decoded information.
      i. In one example, the use of the CNN filter can be conditioned on slice type and/or temporal layer id.
         1. In one example, the CNN filter is applied based on slice type.
            a. In one example, for I slice, the CNN filter is always enabled.
         2. In one example, the CNN filter is applied on B slice whose temporal layer id is equal to 0.
         3. In one example, the CNN filter is applied on both I slice and B slice with temporal id equal to 0.
      ii. In one example, the use of the CNN filter can be determined according to coded mode, block dimension, block location, etc. al.
         1. In one example, for IBC or palette coded blocks, the CNN filter may be implicitly disabled.
      iii. In one example, the use of CNN filter can be conditioned on the decoded information including prediction modes (e.g., intra/inter/IBC), transform types (such as MTS types or LFNST types), skip flag, CBF values, etc.
         1. In one example, CNN filter is used on blocks with the CBF value greater than 0.
         2. In one example, CNN filter in used on non-skip coded blocks.
         3. The use of CNN filter can be conditioned/signaled on block level, TU level, PU level, CU level, CTU level, slice level or picture level.
         4. In one example, CNN filter is disabled on blocks with the CBF value equal to 0.
         5. In one example, CNN filter is disabled on skip coded blocks.
         6. Alternatively, furthermore, when the CNN filter is disabled, the indication of using the CNN filter is not present in the bitstream anymore.
      iv. Alternatively, furthermore, when the CNN filter is determined to be applied, indication of NDFLs may not be signaled, and inferred to be default values (e.g., disabled).
6. CNN information (e.g., on/off, set of CNN filter model) may be controlled at the granularity smaller than a video unit (e.g., a slice/picture/tile/subpicture/CTB/CTU).
   a. In one example, CNN information may be controlled at sample/pixel level.
      i. Whether and/or how to use CNN filters for each pixel can be decided explicitly or implicitly.
   b. In one example, CNN information may be controlled at row/column/line level.
      i. In one example, CNN may be applied in different ways for samples at block boundaries and samples not at block boundaries
   c. In one example, a sample within the video unit may decide whether to apply CNN filters or not even if the CNN filters for the video unit are applied (e.g., the flag indicating the use of CNN filters is true).
      i. In one example, the decision may be dependent on sample locations.
         1. In one example, CNN filter is only applied on samples near the boundary of the video unit.
      ii. In one example, the decision may be dependent on the decoded information, such as location of the sample, coded mode, CBF values, skip flag, etc. al.
      iii. In one example, the decision may depend on the reference sample values and/or whether the sample has been filtered by one or multiple other filters (e.g., NDFLs).
      iv. Alternatively, furthermore, the decision is made on-the-fly instead of being signaled.
   d. In one example, a current sample within the video unit may decide to use which set of CNN filter models according to sample values.
      i. In one example, the sample value is the value of the current sample.
      ii. In one example, the sample values may include the values of neighboring sample of the current sample.
      iii. In one example, the sample values may include the values of the reference sample values and/or prediction samples values of current sample and/or its neighboring samples.
      iv. In one example, instead of directly using the sample values, function of sample values (e.g., gradient, Laplacian activity) may be utilized to select the CNN filter models.
      v. In one example, samples in a video unit with value greater than the value_threshold choose one set of CNN filter model while samples in the video unit with value less or equal than the value_threshold choose the other set of CNN filter model. Here, value_threshold can be derived implicitly or explicitly.
   e. In one example, sample within the video unit may decide to use which set of CNN filter models according to the sample positions.
   f. In one example, samples can be grouped into several classes (e.g. depending on sample values or samples positions). CNN filters are performed differently for different classes.

7. The difference between the CNN filtered sample and its unfiltered version may be clipped to a range.
   a. In one example, the absolution difference between the filtered sample and its unfiltered version (shorted denoted as diff_cnn_filter) is clipped so that diff_cnn_filter<=max_diff_cnn_filter.
      i. In one example, max_diff_cnn filter is signaled for a video unit.
      ii. In one example, max_diff_cnn filter is derived implicitly for a video unit.
   b. The clipping method may be different for different samples or sample groups.
   c. The clipping may be applied to the final output results.
8. The CNN information for different color components may be signaled or derived separately or in different ways.
   a. In one example, the CNN information for Luma and chroma may be signaled or derived separately or in different ways.
9. The CNN information can be signaled at different granularities.
   a. In one example, multiple level control of the CNN filters may be applied.
      i. In one example, a second level (at a smaller video unit) control may be dependent on the first level control information (at a larger video unit containing the smaller video unit).
   b. In one example, the use of CNN filter is decided at slice level.
      i. In one example, an indicator (e.g., a flag) in the slice header is signaled to indicate whether CNN filter is activated for current slice.
   c. In one example, the used of CNN filter is decided at CTU level. For each CTU, a flag is signaled to indicate whether CNN filter is applied on current CTU.
10. The CNN information may be signaled as a SEI message.

On Categories of CNN Filter Models

11. The number of different CNN filter models and/or sets of CNN filter models may be signaled to the decoder.
    a. The number of CNN filter models for different color components may be signaled separately.
12. Different sets of CNN filter models are used for different cases, e.g., according to decoded information.
    a. In one example, there are different sets of CNN filter models corresponding to different color components, and/or different slice types, and/or different QPs.
       i. In one example, QP may be categorized into several groups. For example, different CNN filter models may be used for different QP/M, wherein M is an integer such as 6.
    b. In one example, luma component and chroma component adopt different sets of CNN filter models.
       i. In one example, a first set of CNN filter models is applied to luma component, and a second set of CNN filter models is applied to two chroma components.
       ii. In one example, each color component is associated with its own set of CNN filter models.
       iii. Alternatively, furthermore, how many sets of CNN filter models to be applied for the three-color components may depend on the slice/picture types, and/or partitioning tree types (single or dual tree), etc. al.
    c. In one example, two slice types (e.g., I slice and B (or P) slice) may utilize different sets of CNN filter models.
    d. In one example, for a first color component, two slice types (e.g., I slice and B (or P) slice) may utilize different sets of CNN filter models; while for a second color component, two slice types (e.g., I slice and B (or P) slice) may utilize same set of CNN filter models.
    e. In one example, the selection of a set of CNN filters may depend on temporal layer identification (e.g., the Temporand in the VVC specification) and/or GOP sizes.
       i. In one example, slices or pictures in different temporal layers may utilize different sets of CNN filter models.
       ii. In one example, slices or pictures in different temporal layers share one set of CNN filter models.
       iii. In one example, slices or pictures with temporal layer id equal to 0 use one set of CNN filter models while slices with temporal layer id greater than 0 use the other set of CNN filter models.
       iv. In one example, slice or pictures in temporal layer i use the $i^{th}$ set of CNN filter models, i.e., the number of set of CNN filter models is equal to the number of temporal layers.
       v. In one example, the Temporand may be classified to more than 1 categories, and for each category, a given set of CNN filter models may be applied.
          1. In one example, the categories may include {[0, 0], [1, k], [k+1, m] . . . } wherein k is an integer greater than 1, and m is an integer greater than k.
          2. In one example, the classification may depend on the GOP size.
    f. In one example, the selection of a set of CNN filters may depend on decoded information (e.g., coded mode, CBF values, skip mode flag) and/or sample values before being filtered with the CNN filters.
    g. In one example, the selection of a set of CNN filters may depend on the reference sample information and/or whether the sample has been filtered by one or multiple other filters (e.g., NDFLs).
    h. In one example, for each QP or QP group, one CNN filter model is trained. The number of CNN models is equal to the number of QPs or QP groups.
    i. In one example, one set of CNN filter models may be shared for a QP group.
       iv. In one example, a QP group consists QPs within a given QP range.
       ii. In one example, K (e.g., K=13) sets of CNN models are trained.
          1. In one example, the 13 set of CNN models (e.g., with one set containing one CNN model) are applied for the following 13 QP ranges respectively: [1, 4], [5, 9], [10, 14], [15, 19], [20, 24], [25, 29], [30, 34], [35, 39], [40, 44], [45, 49], [50, 54], [55, 59], [60, 63]
       iii. In one example, K may be dependent on color component, slice types, temporal layer information, etc. al.

On Inputs of CNN Filters

13. It is proposed to input mode information and/or other relevant information to the CNN filters.
   a. In one example, the input includes the reconstructed samples and decoded information (e.g., the partition information, the prediction information).
      i. In one example, the partition information has the same resolution as the reconstructed frame. Sample values in the partition are derived by averaging the reconstructed samples in a coding unit.
      ii. In one example, the prediction information is the generated prediction samples from intra prediction or IBC prediction.
      iii. In one example, the above method may be applied to I slice/pictures, e.g., a CNN filter is trained for enhancing the quality of reconstructed samples in I slice.
   b. Information related to a first color component may be utilized as input for the CNN filtering process applied to a second color component.
      i. Luma information may be utilized as input for chroma CNN filtering process.
         a. In one example, the luma reconstructed samples before being filtered by NDLF or luma CNN filter may be utilized.
            i. Alternatively, the luma reconstructed samples after being filtered by NDLF or luma CNN filter may be utilized
         b. In one example, the input to the CNN contains both chroma reconstructed samples and luma reconstructed samples.
         c. In one example, the above method may be applied for chroma filtering process, e.g., a CNN filter is trained for enhancing the quality of chroma reconstructed samples.
      ii. Chroma information may be utilized as input for luma CNN filtering process.
         a. In one example, the chroma reconstructed samples before being filtered by NDLF or chroma CNN filter may be utilized.
            i. Alternatively, the chroma reconstructed samples after being filtered by NDLF or chroma CNN filter may be utilized
         b. In one example, the input to the CNN contains both chroma reconstructed samples and luma reconstructed samples.
         c. In one example, the above method may be applied for luma filtering process, e.g., a CNN filter is trained for enhancing the quality of luma reconstructed samples.
      iii. One chroma component (e.g., Cb) information may be utilized as input for the color chroma component (e.g., Cr) CNN filtering process.
   c. In one example, the input includes the reconstructed samples and the decoded information (e.g., the mode information, and the prediction information).
      i. In one example, the mode information is a binary frame with each value indicating if the sample belongs to a skip coded unit or not.
      ii. In one example, the prediction information is derived via the motion compensation for inter coded coding unit.
      iii. In one example, the above methods may be applied to inter slices/pictures (e.g., B/P slices), e.g., a CNN filter is trained for enhancing the quality of reconstructed samples in B slice.
   d. In one example, the input includes the prediction sample of current sample, e.g., via intra or inter prediction.
   e. In one example, the input includes the samples non-adjacent to current sample, e.g., via a block vector or a motion vector or template matching results.
   f. In one example, the input includes information derived the reconstruction samples located in a different video unit (e.g., slice/picture).
      i. In one example, the reconstruction samples are only from reference pictures of current slice/picture which includes samples to be filtered by the CNN filter method.
      ii. In one example, the reconstruction samples are those after the CNN or NDFL filter method being applied.
      iii. In one example, the reconstruction samples are those before the CNN or NDFL filter method being applied.
   g. In one example, the input includes information derived the reconstruction samples located in the same video unit (e.g., a slice/picture).
i. In one example, the reconstruction samples are those after the CNN or before the CNN filter method being applied.

14. The positions of input samples used in CNN filter to get an output of a first sample may be constrained in a range determined by the position of the first sample.
   a. In one example, a virtual boundary may be defined for the first sample. Samples above (or below, or left to, or right to) the virtual boundary cannot be used in CNN filter to get the output of the first sample.

Figure 12A:
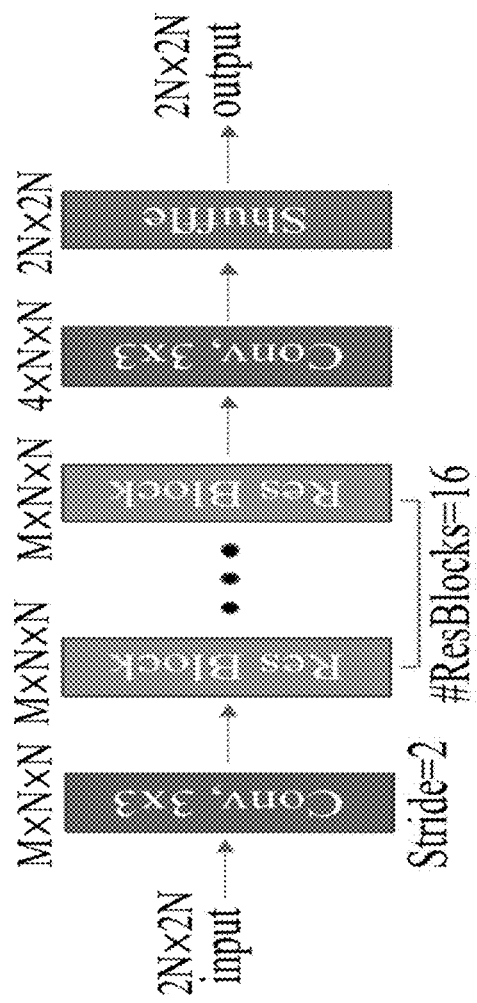

15. The proposed CNN filter comprises multiple convolutional layers. To reduce the complexity and increase the receptive field, a convolutional layer with a stride of K (e.g., K=2) greater than 1 is used in the proposed network.
   a. In one example, the proposed CNN contains a convolutional layer with a stride of K (e.g., K=2) greater than 1 at the beginning to increase the receptive field.
   b. Alternatively, the stride may be set differently for the horizontal and vertical directions.
      i. In one example, the stride for the horizontal direction may be set to a larger value if width of the video unit (picture/slice) to be filtered is larger compared to that for the vertical direction.
   c. When the stride is changed to (2,2), this has the effect of moving the filter two pixels right for each horizontal movement of the filter and two pixels down for each vertical movement of the filter when creating the feature map. Consequently, the resolution of output feature maps will decrease to the half of the input in both horizontal and vertical direction.
   d. In one example, the proposed CNN filter can take the architecture shown in FIGS. 12A-12B. To increase the receptive filed and reduce complexity, the proposed CNN contains a convolutional layer with a stride of 2 at the beginning. After passing through this layer, the spatial resolution of feature maps reduces to the half of the input in both horizontal and vertical direction. The output feature maps from the first convolutional layer then go through several sequentially stacked residual blocks. The last convolutional layer takes the feature maps from the last residual block as input and produces 4 feature maps of N×N. Finally, a shuffle layer is adopted to generate the filter image whose spatial resolution is the same as the input to the CNN, i.e. 2N×2N.
  i. In one example, the number of feature maps, i.e. M in FIG. 12A-12B set as 128.
  ii. In one example, the number of the sequentially stacked residual blocks is set as 16 as shown in FIG. 12A-12B.
  iii. In one example, the residual blocks in FIG. 12A consists of three sequentially connected components as shown in FIG. 12B: a convolutional layer, a PReLU activation function, a convolutional layer. The input to the first convolutional layer is added to the output of the second convolutional layer.

5. Embodiment

This contribution presents a convolutional neural network-based in-loop filter for enhancing the quality of reconstructed frames. The proposed CNN-architecture features a convolutional layer with a stride of 2 and several residual blocks to increase the valid receptive field and enable a smooth optimization. To avoid over filtering, the proposed CNN-based in-loop filter is only applied on I slice and B slice with temporal id equal to 0. Compared with VTM-9.0, the proposed method achieves on average 7.45%, 12.24%, and 10.67% BD-rate reductions for Y, Cb, and Cr respectively under AI configuration, and on average x %, x %, x % BD-rate reductions for Y, Cb, and Cr respectively under RA configuration.

Introduction

In this contribution, a convolutional neural network is trained as an in-loop filter for reducing the distortion incurred during compression. To increase the receptive filed and reduce complexity, the proposed CNN contains a convolutional layer with a stride of 2 at the beginning. To alleviate the difficulty of training for deep networks, residual blocks are utilized as the basic module and stacked several times to construct the final network. Different networks are trained for I-Slice and B-Slice. In addition, different network for luma and chroma are considered. To evaluate the performance, the proposed CNN-based in loop filter is tested on top of VTM-9.0 [1] under both All Intra and Random Access configurations. The proposed CNN-based in loop filters are used exclusively for I slice and B slice with temporal id equal to 0, which means that the original loop filters in VTM including DB, SAO, ALF, and CC-ALF are turned off on I slice and B slice with temporal id equal to 0.

Proposed Method

Network Architecture

Figure 19:
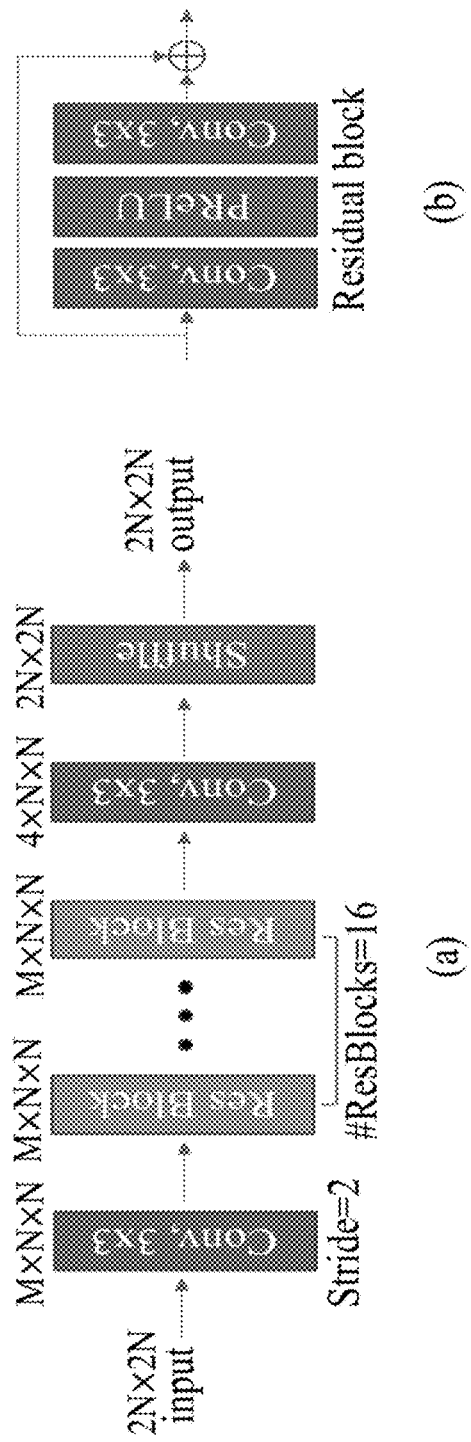
FIG. 19 shows an example filter architecture.

The backbone of the proposed CNN filter is shown in FIG. 19. To increase the receptive filed and reduce complexity, the proposed CNN contains a convolutional layer with a stride of 2 at the beginning. After passing through this layer, the spatial resolution of feature maps reduces to the half of the input in both horizontal and vertical direction. The output feature maps from the first convolutional layer then go through several sequentially stacked residual blocks. The last convolutional layer takes the feature maps from the last residual block as input and produces 4 feature maps of N×N. Finally, a shuffle layer is adopted to generate the filter image whose spatial resolution is the same as the input to the CNN, i.e. 2N×2N. Other details related to the network architecture are illustrated as below:
  1. For all of convolutional layers, kernel size of 3×3 is used. For internal convolutional layers, number of feature maps is set as 128. For the activation function, PReLU is used.
  2. Separate models are trained for the luma and the chroma components, respectively.
  3. Different groups of models are trained for I slice and B slice, respectively.
  4. When training the CNN filters of chroma components, the luma reconstructed samples are also taken as input.
  5. When training the CNN filters for I slice, prediction and partition information are also fed into the network.

FIG. 19(*a*) shows an architecture of the proposed CNN filter, whereby M denotes the number of feature maps. N stands for the number of samples in one dimension, and FIG. 19(*b*) shows a construction of Res Block in FIG. 19(*a*).

Inference

LibTorch is used for performing the inference of the proposed CNN filters in VTM. Currently, the proposed CNN filter is only applied on I slice and B slice with temporal layer id equal to 0. The network information in inference stage is provided in the following Table as suggested by Lucas Theis, Wenzhe Shi, Andrew Cunningham, and Ferenc Huszár. 2017. Lossy image compression with compressive autoencoders. arXiv preprint arXiv:1703.00395 (2017).

TABLE 6

Network Information for NN-based Video Coding Tool Testing in Inference Stage
Network Information in Inference Stage

| Man-datory | HW environment: | |
|---|---|---|
| | SW environment: | CPU: Intel Core i7-7820 × CPU @ 3.60 GHz × 16, 128 GB Memory |
| | Framework: | (e.g. OS: Debian 4.9.65 PyTorch 1.6.0) |
| | Total Cony. Layers | 34 |
| | Total FC Layers | 0 |
| | Total Parameter Number | 4876181 |
| | Parameter Precision | 32(F) |
| | Memory Parameter (MB) | 18.6 |
| | Memory Temp (MB) | 1012.5 (input size: 3840 × 2160) |
| | MAC (Giga) | 3.05 |

Training

PyTorch is used as the training platform. The DIV2K datasets (see Jiahao Li, Bin Li, Jizheng Xu, Ruiqin Xiong, and Wen Gao. 2018. Fully Connected Network-Based Intra Prediction for Image Coding. IEEE Transactions on Image Processing 27, 7 (2018), 3236-3247) and BVI-DVC datasets (see Yuanying Dai, Dong Liu, and Feng Wu. 2017. A convolutional neural network approach for post-processing in HEVC intra coding. In MMM. Springer, 28-39) are adopted to train the CNN filters of I slice and B slice respectively. Different CNN models are trained to adapt to different QP points. The network information in training stage is provided in the following Table as suggested by Lucas Theis, Wenzhe Shi, Andrew Cunningham, and Ferenc Huszár. 2017. Lossy image compression with compressive autoencoders. arXiv preprint arXiv:1703.00395 (2017).

TABLE 7

Network Information for NN-based Video Coding Tool Testing in Training Stage Network Information in Training Stage

| Man-datory | HW environment: | GPU: Tesla-V100-SXM2-32 GB |
|---|---|---|
| | SW environment: | GPU: CUDA, cuDNN |
| | Framework: | TyTorch 1.6.0 |
| | Epoch: | 90 |
| | Batch size: | 64 |
| | Training time: | 30 h |
| | Training data information: | DIV2K, BVI-DVC |

TABLE 7-continued

Network Information for NN-based Video Coding Tool Testing in Training Stage Network Information in Training Stage

| Configurations for generating compressed training data (if different to VTM CTC): | CTC |
| --- | --- |

EXPERIMENTAL RESULTS

The proposed CNN filters are tested on top of VTM-9.0 according to the common test conditions defined in Rui Song, Dong Liu, Houqiang Li, and Feng Wu. 2017. Neural network-based arithmetic coding of intra prediction modes in HEVC. In VCIP. IEEE, 1-4. Test results are shown in Table 8 and Table 9.

From Table 8, we can see that the proposed CNN-based in-loop filter can bring on average xx %, xx %, xx % BD-rate reductions for Y, Cb, and Cr respectively under the RA configuration.

From Table 9, we can see that the proposed CNN-based in-loop filter can bring on average 7.45%, 12.24%, and 10.67% BD-rate reductions for Y, Cb, and Cr respectively under AI configuration.

TABLE 8

Performance of the proposed in-loop CNN filter on top of VTM9.0 under RA configuration

| | Random access Main10 Over VTM-9.0 | | | | |
| --- | --- | --- | --- | --- | --- |
| | Y | U | V | EncT | DecT |
| Class A1 | #VALUE! | #VALUE! | #VALUE! | #NUM! | #NUM! |
| Class A2 | #VALUE! | #VALUE! | #VALUE! | #NUM! | #NUM! |
| Class B | #VALUE! | #VALUE! | #VALUE! | #NUM! | #NUM! |
| Class C | −3.38% | −12.47% | −11.86% | 108% | 958% |
| Class E | | | | | |
| Overall | #VALUE! | #VALUE! | #VALUE! | #NUM! | #NUM! |
| Class D | −3.48% | −14.61% | −13.47% | 108% | 1003% |

TABLE 9

Performance of the proposed in-loop CNN filter on top of VTM9.0 under AI configuration

| | All Intra Main10 Over VTM-9.0 | | | | |
| --- | --- | --- | --- | --- | --- |
| | Y | U | V | EncT | DecT |
| Class A1 | −6.57% | −10.78% | −0.39% | 134% | 20408% |
| Class A2 | −6.41% | −14.00% | −13.45% | 120% | 15121% |
| Class B | −6.17% | −12.66% | −8.67% | 116% | 14684% |
| Class C | −8.32% | −14.68% | −17.05% | 107% | 11838% |
| Class E | −10.31% | −8.02% | −12.99% | 121% | 19527% |
| Overall | −7.45% | −12.24% | −10.67% | 118% | 15582% |
| Class D | −8.14% | −17.64% | −20.32% | 103% | 10392% |

CONCLUSIONS

This contribution presents a CNN-based model for the in-loop filtering. The proposed CNN-based filters are used to replace the original in-loop filters in VTM including DB, SAO, ALF and CC-ALF, and show coding gains. It is proposed to further study CNN-based in-loop filters in the Ad-Hoc group.

Figure 13:
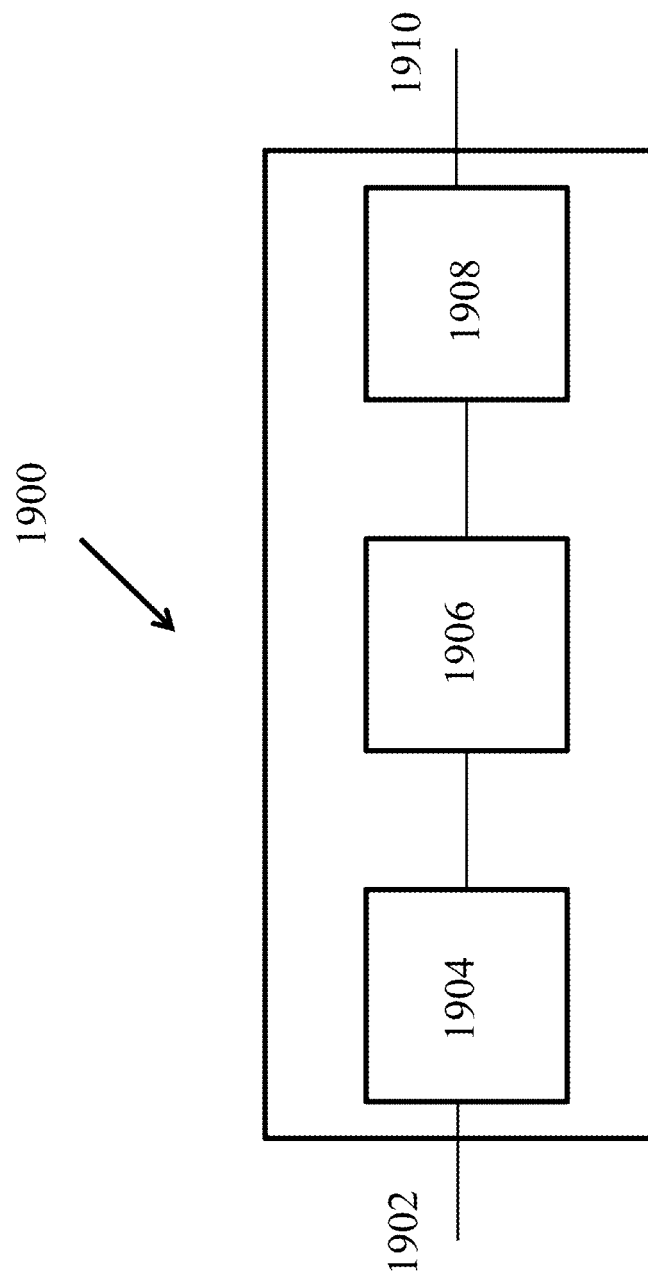
FIG. 13 is a block diagram of an example video processing system.

FIG. 13 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 14:
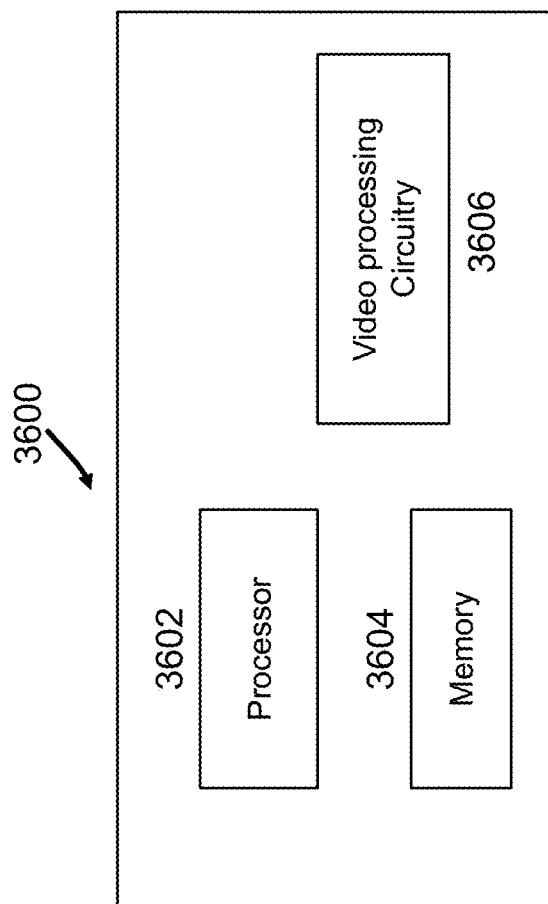
FIG. 14 is a block diagram of a video processing apparatus.

FIG. 14 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 16:
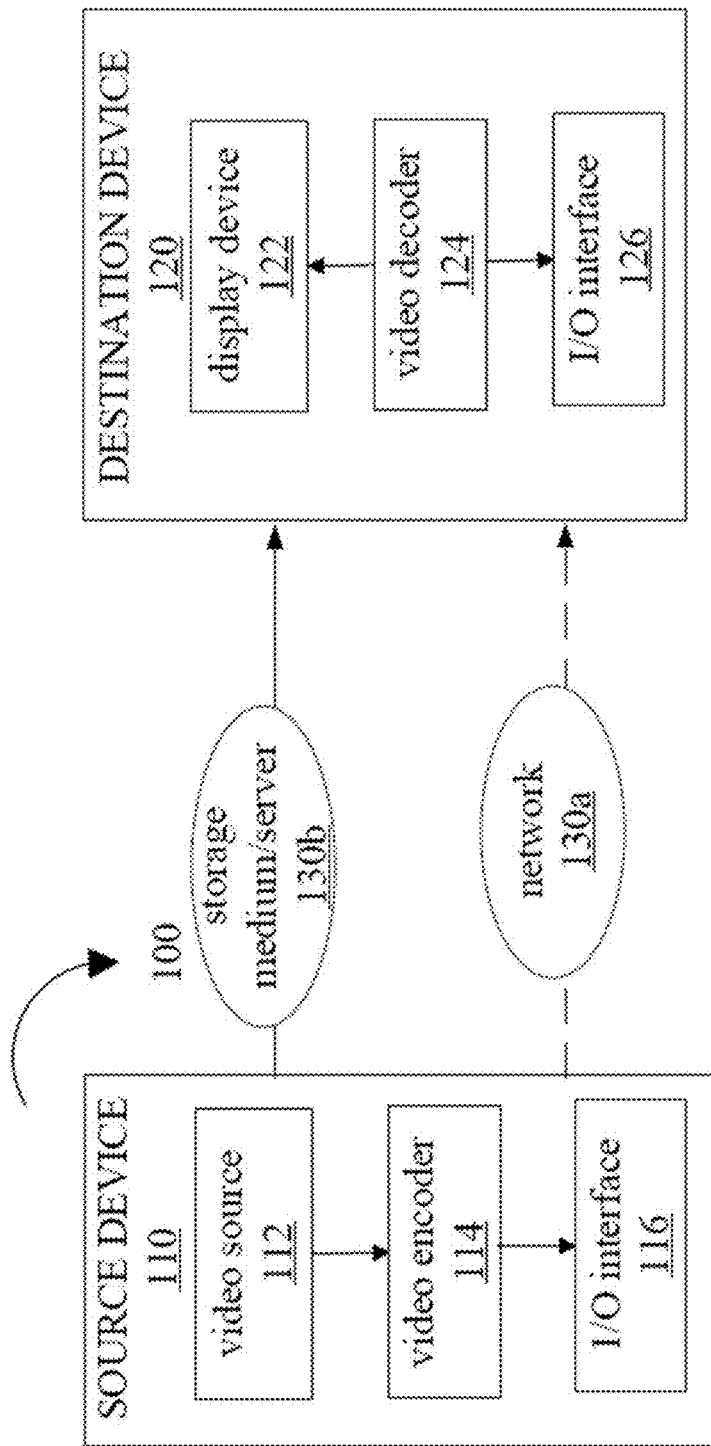
FIG. 16 is a block diagram that illustrates a video coding system in accordance with some embodiments of the present disclosure.

FIG. 16 is a block diagram that illustrates an example video coding system 100 that may utilize the techniques of this disclosure.

As shown in FIG. 16, video coding system 100 may include a source device 110 and a destination device 120.

Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/ server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 17:
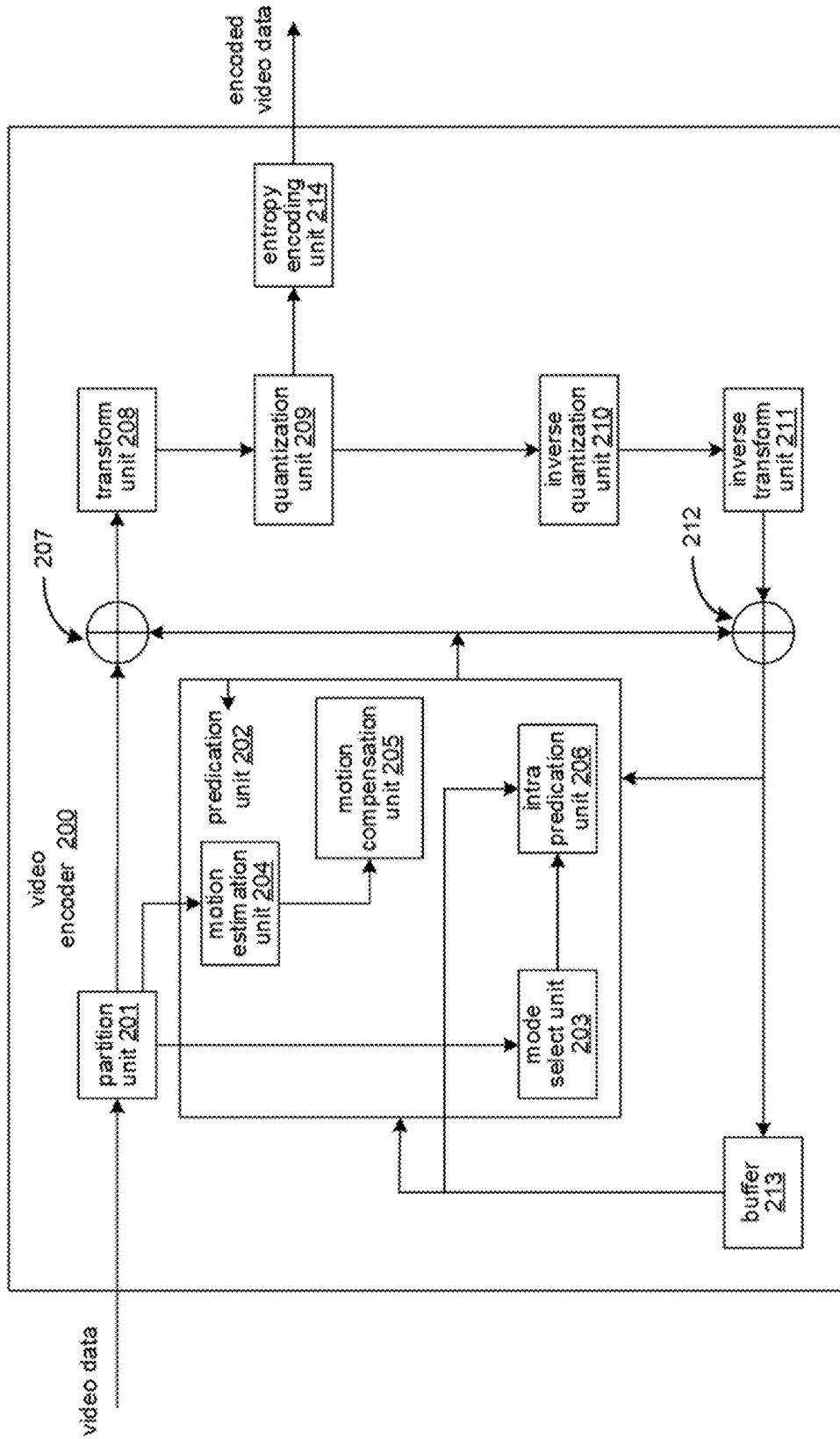
FIG. 17 is a block diagram that illustrates an encoder in accordance with some embodiments of the present disclosure.

FIG. 17 is a block diagram illustrating an example of video encoder 200, which may be video encoder 114 in the system 100 illustrated in FIG. 16.

Video encoder 200 may be configured to perform any or all of the techniques of this disclosure. In the example of FIG. 17, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 17 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 18:
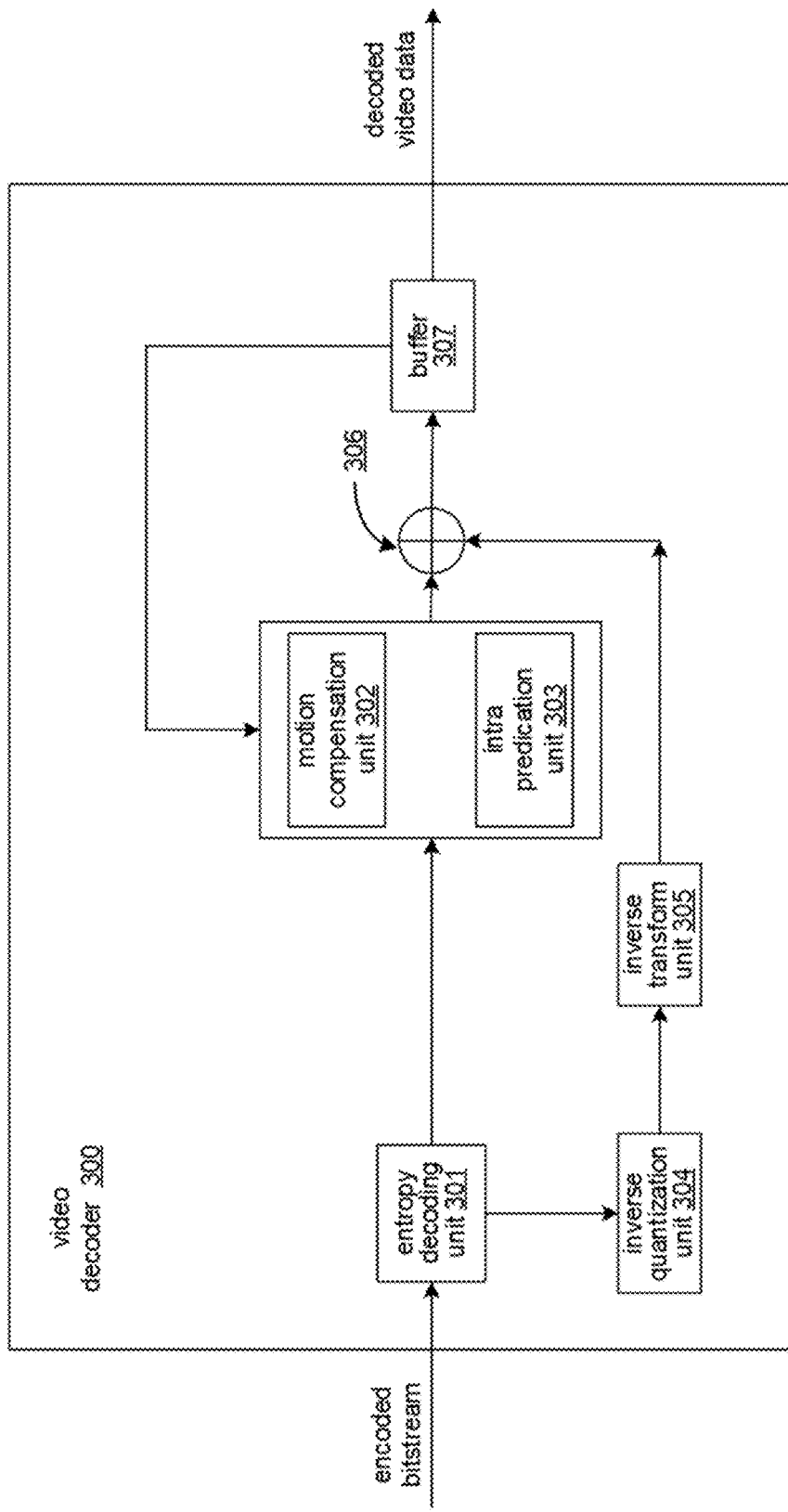
FIG. 18 is a block diagram that illustrates a decoder in accordance with some embodiments of the present disclosure.

FIG. 18 is a block diagram illustrating an example of video decoder 300 which may be video decoder 114 in the system 100 illustrated in FIG. 16.

The video decoder 300 may be configured to perform any or all of the techniques of this disclosure. In the example of FIG. 18, the video decoder 300 includes a plurality of functional components. The techniques described in this disclosure may be shared among the various components of the video decoder 300. In some examples, a processor may be configured to perform any or all of the techniques described in this disclosure.

In the example of FIG. 18, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 17).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

A first set of solutions is provided below. The following solutions show example embodiments of techniques discussed in the previous section (e.g., items 1-3).

Figure 15:
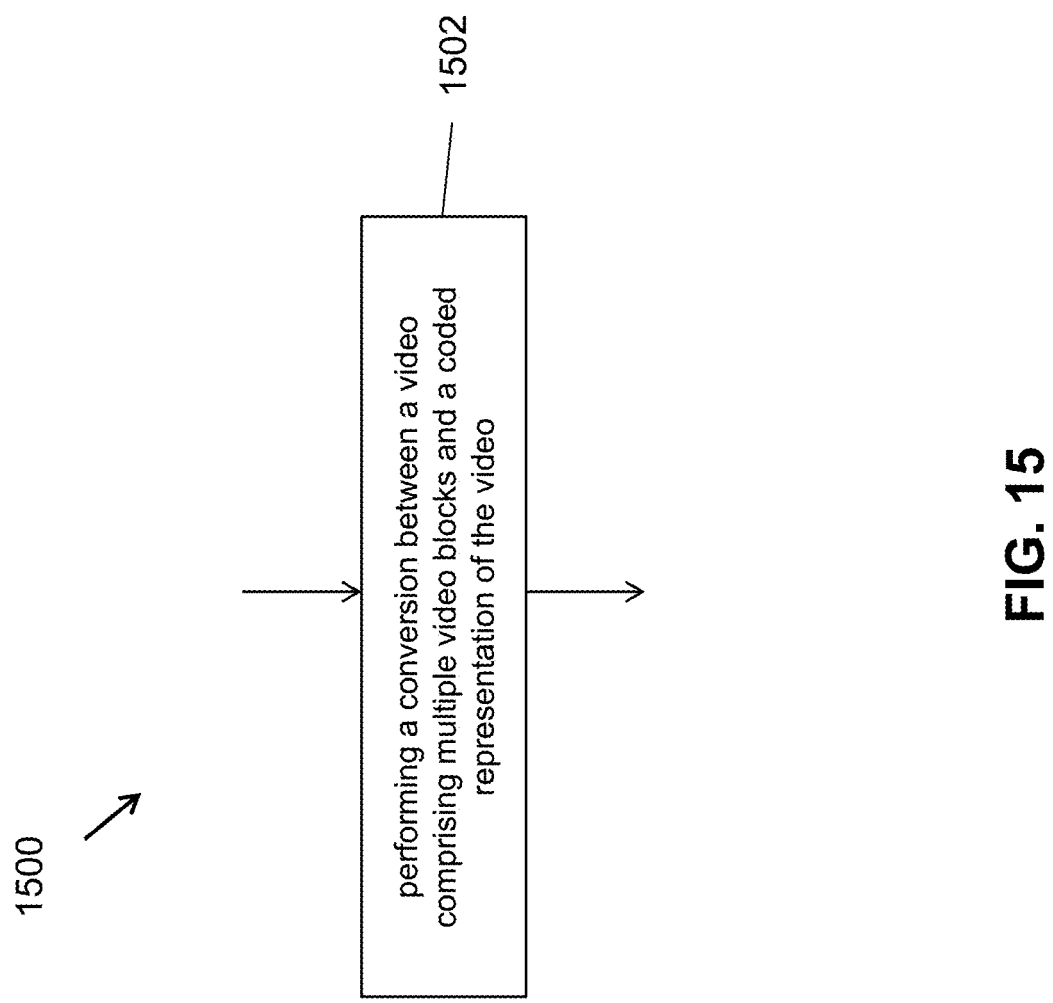
FIG. 15 is a flowchart for an example method of video processing.

1. A method of digital media processing (e.g., method 1500 depicted in FIG. 15), comprising: performing (1502) a conversion between a video comprising multiple video blocks and a coded representation of the video, wherein, the conversion includes, selectively applying a convolutional neural network (CNN) filter to some of the video blocks based on a rule; wherein the rule defines whether and how the CNN filter is applied together with a filter having a non-deep learning filter (NDLF) filter type during the conversion.

2. The method of solution 1, wherein the rule specifies that in cases that the CNN filter is applied across a given edge, then no filter of the NDLF type is allowed.

3. The method of solution 1, wherein the coded representation identifies which filters of the NDLF type are allowed or disallowed for application together with the CNN filter.

4. The method of any of solutions 1-3, wherein the rule is specified on a video region basis, wherein the video region comprises a slice, coding tree unit (CTU), a coding tree block (CTB) or a CTU/CTB row, a slice, a tile, a subpicture, a picture or a sequence.

5. The method of solution 1, wherein the rule specifies that in a case that the CNN filter is applied to a video block, a first filter of the NDLF type is enabled for the video block, and wherein the rule further specifies a sequence of application of the CNN filter and the first filter.

The following solutions show example embodiments of techniques discussed in the previous section (e.g., items 3-8).

6. A method of video processing, comprising: determining, based on a coding condition of a current video block of a video, applicability of a convolutional neural network (CNN) filter to the current video block according to a rule; and performing a conversion between the video and a coded representation of the video based on the determining.

7. The method of solution 6, wherein the rule specifies that the CNN filter is applicable to the current vide block that belongs to a type of a slice or a type of a picture or an identity of a temporal layer or a condition on a reference picture list.

8. The method of solutions 6-7, wherein the rule further specifies how the CNN filter is applied based on a profile of the video or a format to which the coded representation is configured.

9. The method of any of solutions 6-8, wherein the rule is specified on a per color component basis.

10. The method of any of solutions 6-9, wherein the rule is indicated in a supplemental enhancement information field of the coded representation.

The following solutions show example embodiments of techniques discussed in the previous section (e.g., items 9-10).

11. A method of video processing, comprising: performing a conversion between a video and a coded representation of a video, wherein the coded representation conforms to a format rule; wherein the format rule specifies that a syntax field includes information about one or more filter models for a convolutional neural network filter applicable to the conversion.

12. The method of solution 11, wherein the format rule further specifies that the syntax field is color component specific.

The following solutions show example embodiments of techniques discussed in the previous section (e.g., items 11-13).

13. A method of video processing, comprising: operating, for a conversion between a current video block of a video and a coded representation of the video, on the current video block a convolutional neural filter (CNN) using an input information; and performing the conversion according to the operating.

14. The method of solution 13, wherein the input information includes decoded information for the current video block.

15. The method of any of solutions 13-14, wherein the input information includes color information of a color component of the current video block or a color component different from the current video block.

16. The method of solution 13, wherein the input information includes reconstructed sample information of the current video block.

17. The method of any of solutions 13-16, wherein the input information includes a prediction sample of the current video block.

18. The method of any of above solutions, wherein the NDLF type includes a deblocking filter or a sample adaptive offset filter or an adaptive loop filter or a cross-component adaptive loop filter.

19. The method of any of the above solutions, wherein the CNN comprises a loop filter.

20. The method of any of solutions 1-19, wherein the conversion comprises generating a coded representation of the video.

21. The method of any of solutions 1-19, wherein the conversion comprises generating the video by decoding the coded representation.

22. A video decoding apparatus comprising a processor configured to implement a method recited in one or more of solutions 1 to 21.

23. A video encoding apparatus comprising a processor configured to implement a method recited in one or more of solutions 1 to 21.

24. A computer program product having computer code stored thereon, the code, when executed by a processor, causes the processor to implement a method recited in any of solutions 1 to 21.

25. A computer readable medium on which a bitstream representation complying to a file format that is generated according to any of solutions 1 to 21.

26. A method, apparatus or system described in the present document.

A second set of solutions provides example embodiments of techniques discussed in the previous section (e.g., items 5.c.iii, 6, 12.e).

1. A method of processing visual media data (e.g., method 2010 as shown in FIG. 20), comprising: determining 2012, for a conversion between visual media data and a bitstream of the visual media data, how to apply one or more convolutional neural network filters to at least some samples of a video unit of the visual media data according to a rule; and performing 2014 the conversion based on the determining.
2. The method of claim 1, wherein a convolutional neural network filer is implemented using a convolutional neural network.
3. The method of claim 1, wherein the rule specifies that the determining is based on decoded information associated with the video unit, wherein the decoded information includes at least one of prediction modes, transform types, a skip flag, or coded block flag (CBF) values.
4. The method of claim 1, wherein the rule specifies that information related to the one or more convolutional neural network filters is controlled at a granularity smaller than the video unit.
5. The method of claim 4, wherein the video unit is a slice or a picture or a tile or a subpicture or a coding tree block or a coding tree unit.
6. The method of claim 4, wherein the information is controlled at a sample or pixel level.
7. The method of claim 4, wherein the information is controlled at a row or a column or a line level.
8. The method of claim 4, wherein the rule specifies that a set of convolutional neural network filters is determined based on a value or position of a sample within the video unit of the visual media data.
9. The method of claim 1, wherein the rule specifies that a selection of a set of convolutional neural network filters depends on a temporal layer identification of the video unit and/or a GOP (group of pictures) size of the video unit.
10. The method of claim 1, wherein the temporal layer identification is classified to more than one categories and a given set of convolutional neural network filters is applied for a corresponding category.
11. The method of claim 10, wherein classification of the temporal layer identification is based on the GOP size.
12. The method of claim 1, wherein the rule specifies that a set of convolutional neural network filters is utilized for video units with different temporal layers.
13. The method of any one of claims 1 to 12, wherein the performing of the conversion comprises generating the bitstream from the visual media data.
14. The method of any one of claims 1 to 12, wherein the performing of the conversion comprises generating the visual media data from the bitstream.
15. An apparatus for processing visual media data comprising a processor and a non-transitory memory with instructions thereon, wherein the instructions upon execution by the processor, cause the processor to: determine, for a conversion between visual media data and a bitstream of the visual media data, how to apply one or more convolutional neural network filters to at least some samples of a video unit of the visual media data according to a rule; and perform the conversion based on the determining.
16. The apparatus of claim 15, wherein the rule specifies that the determining is based on decoded information associated with the video unit, wherein the decoded information includes at least one of prediction modes, transform types, a skip flag, or coded block flag (CBF) values.
17. The apparatus of claim 15, wherein the rule specifies that information related to the one or more convolutional neural network filters is controlled at a granularity smaller than the video unit.
18. A non-transitory computer-readable storage medium storing instructions that cause a processor to: determine, for a conversion between visual media data and a bitstream of the visual media data, how to apply one or more convolutional neural network filters to at least some samples of a video unit of the visual media data according to a rule; and perform the conversion based on the determining.
19. The non-transitory computer-readable storage medium of claim 18, wherein the rule specifies that the determining is based on decoded information associated with the video unit, wherein the decoded information includes at least one of prediction modes, transform types, a skip flag, or coded block flag (CBF) values.
20. The non-transitory computer-readable storage medium of claim 18, wherein the rule specifies that information related to the one or more convolutional neural network filters is controlled at a granularity smaller than the video unit.
21. A video processing apparatus comprising a processor configured to implement a method recited in any one or more of claims 1 to 14.
22. A method of storing a bitstream of visual media data, comprising a method recited in any one of claims 1 to 14, and further including storing the bitstream to a non-transitory computer-readable recording medium.
23. A computer readable medium storing program code that, when executed, causes a processor to implement a method recited in any one or more of claims 1 to 14.
24. A computer readable medium that stores a bitstream generated according to any of the above described methods.
25. A video processing apparatus for storing a bitstream, wherein the video processing apparatus is configured to implement a method recited in any one or more of claims 1 to 14.
26. A computer readable medium on which a bitstream representation complying to a file format that is generated according to any of claims 1 to 14.

In the present document, the term "media or video processing" may refer to media encoding, media decoding, media compression or media decompression. The terms, media and visual media data, may refer to video, audio or image. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing visual media data, comprising:
determining, for a conversion between visual media data and a bitstream of the visual media data, how to apply one or more convolutional neural network filters to at least some samples of a video unit of the visual media data according to a rule; and
performing the conversion based on the determining,
wherein the rule specifies that a selection of a set of convolutional neural network filters depends on a category of a temporal layer identification of the video unit, wherein a given set of convolutional neural network filters is applied for a corresponding category of the temporal layer identification, and wherein the temporal layer identification is classified to more than one categories based on a GOP (group of pictures) size of the video unit,
wherein the rule further specifies that whether to apply the set of convolutional neural network filters depends on a sample position of a sample within the video unit.

2. The method of claim 1, wherein the one or more convolutional neural network filter is implemented using a convolutional neural network.

3. The method of claim 1, wherein the rule specifies that the determining is based on decoded information associated with the video unit, wherein the decoded information includes at least one of prediction modes, transform types, a skip flag, or coded block flag (CBF) values.

4. The method of claim 1, wherein the rule specifies that information related to the one or more convolutional neural network filters is controlled at a granularity smaller than the video unit.

5. The method of claim 4, wherein the video unit is a slice or a picture or a tile or a subpicture or a coding tree block or a coding tree unit.

6. The method of claim 4, wherein the information is controlled at a sample or pixel level.

7. The method of claim 4, wherein the information is controlled at a row or a column or a line level.

8. The method of claim 4, wherein the rule specifies that the set of convolutional neural network filters is determined based on a value of a sample within the video unit of the visual media data.

9. The method of claim 1, wherein the rule specifies that a set of convolutional neural network filters is utilized for video units with different temporal layers.

10. The method of claim 1, wherein the performing of the conversion comprises generating the bitstream from the visual media data.

11. The method of claim 1, wherein the performing of the conversion comprises generating the visual media data from the bitstream.

12. An apparatus for processing visual media data comprising a processor and a non-transitory memory with instructions thereon, wherein the instructions upon execution by the processor, cause the processor to:
 determine, for a conversion between visual media data and a bitstream of the visual media data, how to apply one or more convolutional neural network filters to at least some samples of a video unit of the visual media data according to a rule; and
 perform the conversion based on the determining,
 wherein the rule specifies that a selection of a set of convolutional neural network filters depends on a category of a temporal layer identification of the video unit, wherein a given set of convolutional neural network filters is applied for a corresponding category of the temporal layer identification, and wherein the temporal layer identification is classified to more than one categories based on a GOP (group of pictures) size of the video unit,
 wherein the rule further specifies that whether to apply the set of convolutional neural network filters depends on a sample position of a sample within the video unit.

13. The apparatus of claim 12, wherein the rule specifies that the determining is based on decoded information associated with the video unit, wherein the decoded information includes at least one of prediction modes, transform types, a skip flag, or coded block flag (CBF) values.

14. The apparatus of claim 12, wherein the rule specifies that information related to the one or more convolutional neural network filters is controlled at a granularity smaller than the video unit.

15. A non-transitory computer-readable storage medium storing instructions that cause a processor to:
 determine, for a conversion between visual media data and a bitstream of the visual media data, how to apply one or more convolutional neural network filters to at least some samples of a video unit of the visual media data according to a rule; and
 perform the conversion based on the determining,
 wherein the rule specifies that a selection of a set of convolutional neural network filters depends on a category of a temporal layer identification of the video unit, wherein a given set of convolutional neural network filters is applied for a corresponding category of the temporal layer identification, and wherein the temporal layer identification is classified to more than one categories based on a GOP (group of pictures) size of the video unit,
 wherein the rule further specifies that whether to apply the set of convolutional neural network filters depends on a sample position of a sample within the video unit.

16. The non-transitory computer-readable storage medium of claim 15, wherein the rule specifies that the determining is based on decoded information associated with the video unit, wherein the decoded information includes at least one of prediction modes, transform types, a skip flag, or coded block flag (CBF) values.

17. The non-transitory computer-readable storage medium of claim 15, wherein the rule specifies that information related to the one or more convolutional neural network filters is controlled at a granularity smaller than the video unit.

* * * * *